(12) United States Patent  
Sachdev et al.

(10) Patent No.: US 8,751,698 B1  
(45) Date of Patent: Jun. 10, 2014

(54) STORAGE PATH MANAGEMENT HOST AGENT

(75) Inventors: Vinay S. Sachdev, Dracut, MA (US); Harold M. Sandstrom, Belmont, MA (US); Todd R. Gill, Medford, MA (US)

(73) Assignee: EMC Corporation, Hopkinton, MA (US)

( * ) Notice: Subject to any disclaimer, the term of this patent is extended or adjusted under 35 U.S.C. 154(b) by 49 days.

(21) Appl. No.: 13/250,583

(22) Filed: Sep. 30, 2011

(51) Int. Cl.
*G06F 3/00* (2006.01)
*G01R 31/08* (2006.01)

(52) U.S. Cl.
USPC .................................. 710/16; 370/237

(58) Field of Classification Search
USPC ............................................... 710/16
See application file for complete search history.

(56) References Cited

U.S. PATENT DOCUMENTS

| | | | |
|---|---|---|---|
| 7,120,118 B2 * | 10/2006 | Rajagopal et al. | 370/237 |
| 7,260,628 B2 * | 8/2007 | Yamamoto et al. | 709/224 |
| 2010/0064067 A1 * | 3/2010 | Kottomtharayil et al. | 710/17 |
| 2010/0318692 A1 * | 12/2010 | Koll et al. | 710/38 |
| 2012/0303822 A1 * | 11/2012 | Huang et al. | 709/227 |

\* cited by examiner

*Primary Examiner* — Titus Wong
(74) *Attorney, Agent, or Firm* — Krishnendu Gupta; Gerald P. Kazanjian

(57) ABSTRACT

In large complex multi-path storage environments, knowing there is a problem is extremely valuable. Example embodiments of the present invention include a management framework that provides an easy to use and read graphical perspective that allows analysis of faults in a multi-path storage environment. The architecture is not only responsive, scalable, and robust, but also provides "middleware" services to a broad spectrum of enterprise management applications whose domains may extend beyond storage path management. The management framework includes a consolidator that, along with an agent on the hosts, supports an administrator in: collecting storage path information from hosts; summarizing, aggregating, filtering, and reformatting storage path information to serve enterprise management needs and policies; forwarding an alert regarding storage path information to interested managers; routing storage path management commands from managers to hosts; and reporting command completion status from the host back to the requesting manager.

18 Claims, 23 Drawing Sheets

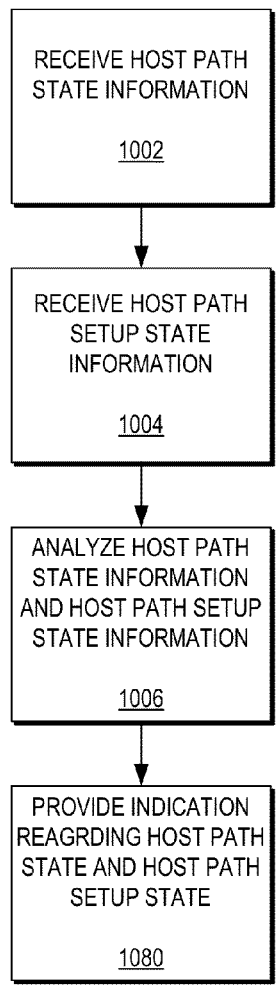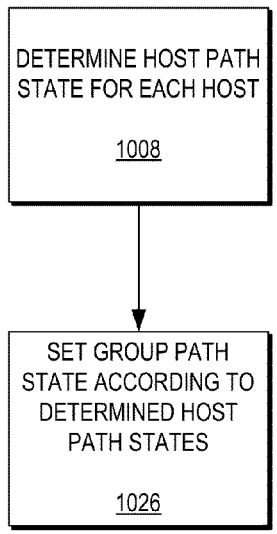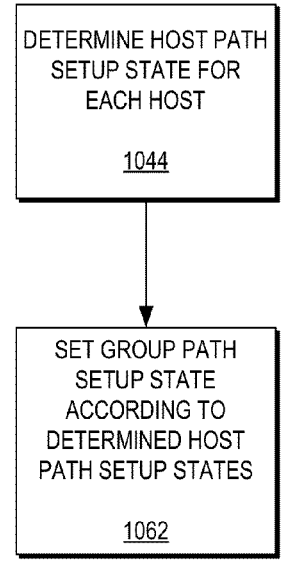
FIG. 10A
FIG. 10B
FIG. 10E

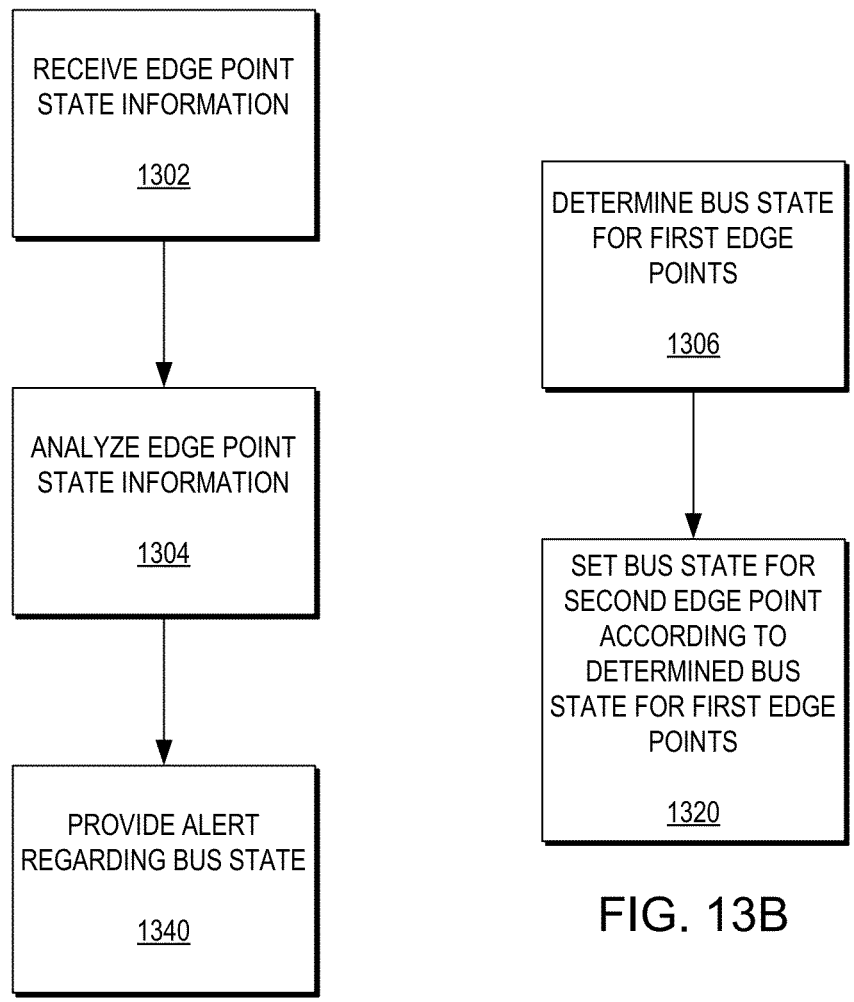

STORAGE PATH MANAGEMENT HOST AGENT

CROSS REFERENCE TO RELATED APPLICATIONS

This Application is related to U.S. patent application Ser. No. 13/250,314 entitled "STORAGE PATH MANAGEMENT HOST VIEW", Ser. No. 13/250,449 entitled "STORAGE PATH MANAGEMENT ARCHITECTURE", and Ser. No. 13/250,512 entitled "STORAGE PATH MANAGEMENT BUS VIEW", filed concurrently with the present Application on Sep. 30, 2011, the teachings of which are hereby incorporated by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to storage path management.

BACKGROUND

Enterprise storage systems store data in large-scale environments and differ from consumer storage systems in both the size of the environment and the types of technologies that store and manage the data. Storage area networks (SANs) are commonly used in enterprise storage systems to transfer data between computer systems and storage devices. A typical SAN provides a communication infrastructure, including physical connections between computer systems, storage devices, and a management layer that organizes the connections between computer systems and storage devices.

In a SAN environment, computer systems, typically referred to as hosts, connect to the SAN via one or more host bus adapters. In the case of a Fibre Channel SAN, the physical connections between hosts and storage devices may include special Fibre Channel host bus adapters, Fibre Channel switches, Fibre Channel routers, and optical fiber.

Storage devices may include multiple disk drives that combine to form a disk array. A typical disk array includes a disk array controller, a cache, disk enclosures, and a power supply. Examples of disk arrays include the SYMMETRIX Integrated Cache Disk Array System the CLARIION Disk Array System, both available from EMC Corporation of Hopkinton, Mass. A disk array controller is a piece of hardware that provides storage services to computer systems that access the disk array. The disk array controller may attach to a number of disk drives that are located in the disk enclosures. For example, the disk drives may be organized into redundant array of inexpensive disks (RAID) groups for redundancy and efficient performance. RAID is a system that uses multiple disk drives that share or replicate data among the drives. Accordingly, a RAID system can present multiple physical hard drives to a host as a single logical disk drive.

Disk array controllers connect to a SAN via a port. A port serves as an interface between the disk array controller and other devices, such as the hosts, in the SAN. Each disk array controller typically includes two or more ports. Disk array controllers may communicate with other devices using various protocols, such as the SCSI (Small Computer System Interface) command protocol over a Fibre Channel link to the SAN. In the SCSI command protocol, each device is assigned a unique numerical identifier, which is referred to as a logical unit number (LUN). Further, communication using the SCSI protocol is said to occur between an "initiator" (e.g., a host bus adapter port) and a "target" (e.g., a storage controller port) via a path (i.e., a storage path). For example, a path may include a host bus adapter port, associated SCSI bus or Fibre Channel cabling, a disk array port, and a LUN. The types of path components in use vary with the storage I/O transport technology in use.

Management of storage paths is provided by path management software. Path management software is a host-based software solution that is used to manage paths and, among other things, can detect load imbalances across paths and buses and can identify alternate paths through which to route data. An example of path management software is EMC POWERPATH by EMC Corporation of Hopkinton, Mass.

Although prior path management software systems may monitor load balances and identify alternate paths through which to route data, a network or storage administrator must evaluate network path faults. Current approaches for detecting setup and path problems in a SAN require analysis of difficult to read output from various user interfaces, including CLIs. Although custom programming and scripts are available to monitor system logs and device states, the number of path faults that an administrator must identify and remedy increases dramatically as the amount of data and number of physical connections between initiators and targets increase. This may cause a delay in the administrator restoring a path, and lead to increased costs due to having administrators responsible for managing path management. Further, detecting setup and path problems in prior path management systems require the use of custom programming/scripts to monitor system logs and device states or a host-based Command Line Interface (CLI) typically accessed via remote shell and analysis of complex and unwieldy text output from CLIs.

SUMMARY

Example embodiments of the present invention relate to a method, an apparatus and a computer-program product for distributing alerts created according to storage path information. The method includes receiving storage path information in a multi-pathing environment, creating an alert according to the storage path information, and distributing the alert to listening management entities in the multi-pathing environment.

BRIEF DESCRIPTION OF THE DRAWINGS

The above and further advantages of the present invention may be better under stood by referring to the following description taken into conjunction with the accompanying drawings in which:

FIGS. 10A-10G are flow diagrams illustrating a method for providing an alert regarding a host path state and a host path setup state according to an example embodiment of the present invention;

FIGS. 13A-13D are flow diagrams illustrating a method for providing an alert regarding a bus state according to an example embodiment of the present invention;

DETAILED DESCRIPTION

Traditional path management systems hide problems in a storage area network (SAN) or other interconnection mechanism between hosts and arrays. The main purpose of a path management system is twofold: (1) failover (i.e., when an I/O fails down one path, it is sent down another path); and (2) load balancing (i.e., the ability to increase bandwidth by sending I/Os down multiple parallel paths). Because multi-pathing failover is so effective, it hides problems in the SAN from applications performing I/Os. However, administrators need to know about these problems because, if allowed to persist, more problems could occur and eventually the application could be impacted. Additionally, a multi-pathing system may be misconfigured and cannot use all the paths presented to it for accessing a logical unit (LU). In this case, even a single problem will impact the application. Accordingly, example embodiments of the present invention address these problems and provide a way to survey all the hosts (e.g., up to tens of thousands of hosts in certain data centers) to make sure they are not misconfigured.

Architecture

Figure 1:
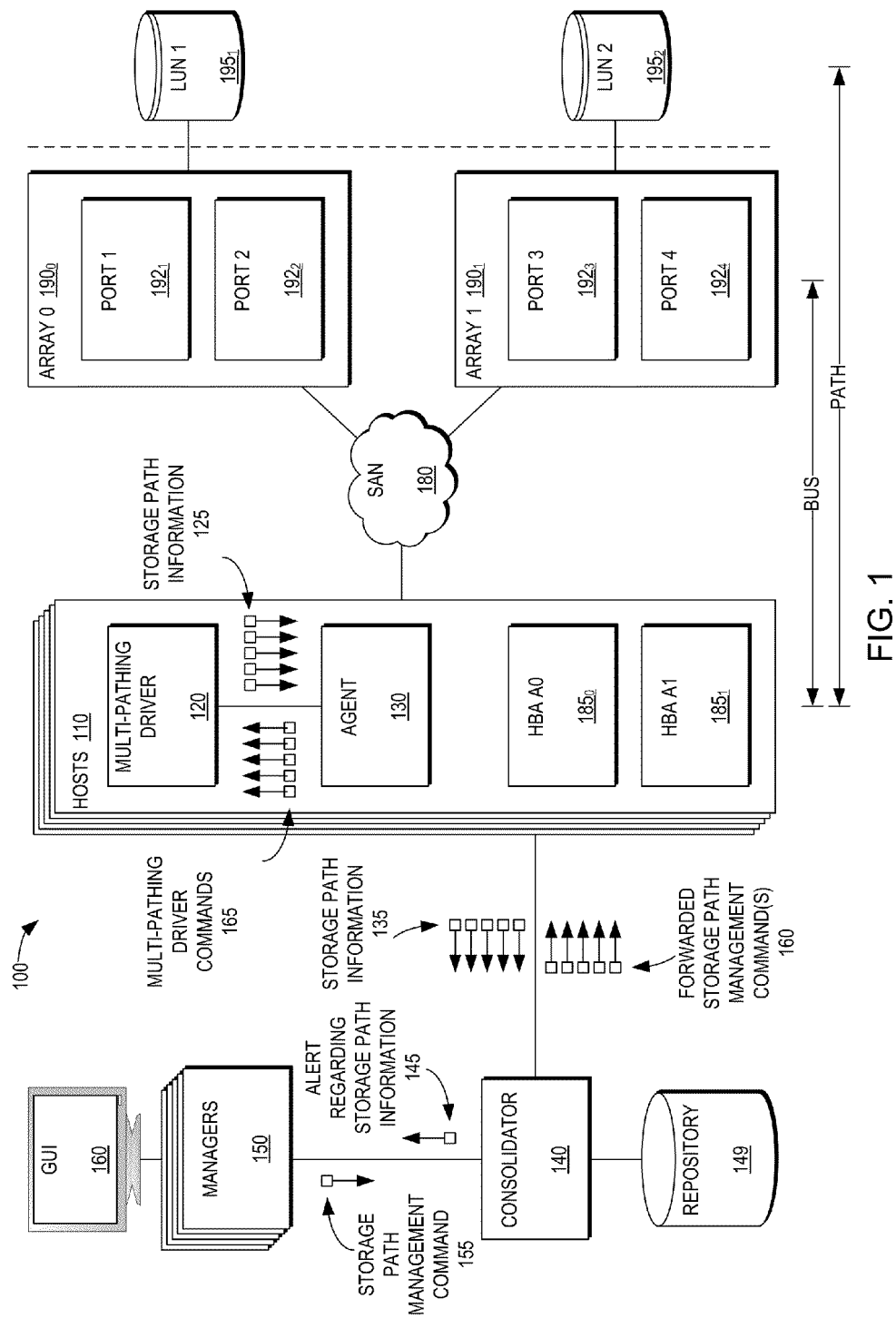
FIG. 1 is a block diagram illustrating a multi-path storage environment according to an example embodiment of the present invention.

FIG. 1 is a block diagram illustrating a multi-path storage environment (i.e., data center) 100 according to an example embodiment of the present invention. Such multi-path storage environments 100 typically are deployed with redundancies for enterprise purposes. For example, the multi-path storage environment 100 of FIG. 1 illustrates redundant paths from Host Bus Adapter (HBA) port A0 $185_0$ and HBA port A1 $185_1$ on host 110 over a Storage Area Network (SAN) 180 to LUN 1 $195_1$ and LUN 2 $195_2$ through ports 1-4 $192_1$-$192_4$ of Array 0 $190_0$ and Array 1 $190_1$, respectively. These redundancies in data centers 100 provide value by preventing data unavailability (DU); however, redundancies also can hide faults and problems from storage administrators. It can also be very difficult to pinpoint where corrective actions need to be taken when there are problems, and to access the systems on which corrective actions need to be performed, through either a manual or automated task.

In large complex multi-path storage environments 100, as illustrated in FIG. 1, knowing there is a problem is extremely valuable. Traditional approaches for management of a multi-path storage environment 100 involve the use of command line interfaces (CLIs) and other utilities running on the multi-pathed host 110. While this approach may be satisfactory for single-host functionality, the ascendance of host virtualization and embedded operating systems has rendered the CLI-based approach obsolete. Also, the deluge of data generated from the multi-path host involves time-consuming manual intervention by an administrator to inspect it in order to make it meaningful (i.e., expert analysis of the results from CLIs is required to determine if a fault has occurred and if the storage multi-path parameters are configured properly). This process is time consuming and prone to mistakes and confusion.

This leads to a strong need for an intelligent component active in the host which filters and aggregates the relevant data and prepares it for distribution and consumption by external entities. Accordingly, example embodiments of the present invention include a management framework supporting such tasks that provides an easy to use and read graphical perspective that allows analysis of faults in a multi-path storage environment at a glance. The architecture is not only responsive, scalable, and robust, but also provides "middleware" services to a broad spectrum of enterprise management applications whose domains may extend beyond storage path management.

The management framework includes a consolidator 140 that, along with a respective agent 130 on each of the hosts 110 that collects storage path information 125, supports an administrator in: discovering storage path management driver (e.g., multi-pathing driver) instances 120 on hosts 110; collecting and storing 149 path information 135 from hosts 110; summarizing, aggregating, filtering, and reformatting storage path information 135 to serve enterprise management needs and policies; forwarding processed storage path information as an alert regarding storage path information 145 to interested managers 150; routing storage path management commands 155 from managers 150 to hosts 110 as forwarded storage path management commands 160; and reporting command completion status 135 from the host 110 back to the requesting manager 150.

The management framework also includes, according to example embodiments of the present invention, a graphical user interface (GUI) 160 that displays a storage path management application that allows viewing multi-path storage environments in a simplified manner. This path management architecture supports identifying problems, including path state and path setup state problems, at a glance. As will be described below in greater detail, an administrator may drill down through information made available via the GUI to storage devices to determine origins of a problem without having to interact with the host (e.g., physically going to a host, remotely connecting to a host or using CLI tools). Accordingly, the architecture allows responsive and detailed path state monitoring across a large population of hosts, as well as active management of paths on hosts, and RESTful-style web services.

Host Agent

Figure 2A:
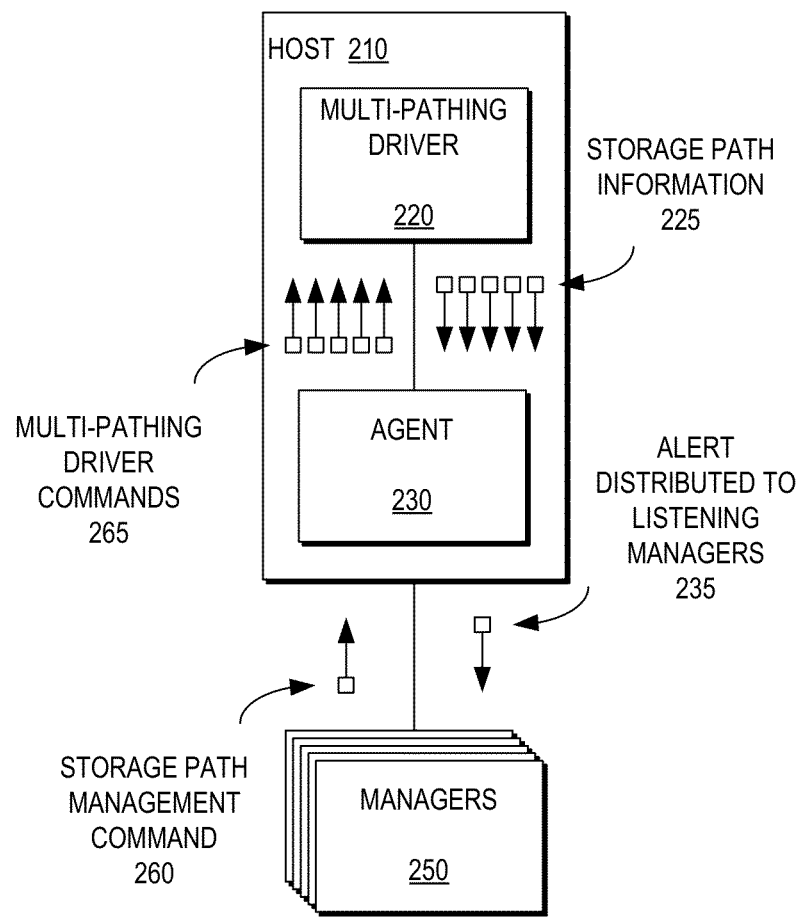
FIGS. 2A and 3 are block diagrams illustrating a host agent according to example embodiments of the present invention.

FIG. 2A is a block diagram illustrating a host agent 230 according to an example embodiment of the present invention. The host agent 230 runs as a user process on the multi-pathed host and relieves an administrator of the task of processing multi-path events. The host agent also handles remote commands (i.e., requests) from remote management entities (i.e., managers). Accordingly, the host agent 230 listens for and queues multi-path driver events (e.g., path dead/alive and volume all-paths-dead events) and communicates with the one or many external consumers (i.e., managers) with appropriate path state updates (i.e., alerts).

As illustrated in FIG. 2A, at the bottom of the framework is a common host presence, or agent 230, residing on each multi-pathed host 210. At system startup on the host 210, the agent 230 discovers the host's multi-pathing resources (e.g., SCSI Initiator-Target-LU nexus (I-T-L)) and their initial states by communicating with the multi-pathing driver 220 via, for example, a multi-pathing application programming interface (API) (not shown). The agent 230 then listens for storage path information 225 (e.g., storage path management events and storage path resource information) via, for example, a kernel event interface (not shown) available via the same API. Path events can be either polled for by the agent 230 or generated asynchronously by the driver 220 via, for example asynchronous event notification (AEN).

The host agent 230 may provide at least the following functionality with respect to storage path information 225: (1) a host path event processor to aggregate, summarize, filter, and reformat storage path management events as alerts; and (2) an alert broadcaster to forward processed storage path management events as alerts (i.e., results of complex event processing) to listening managers.

The host agent 230 also listens for network connections from one of at least three possible types of managers: (1) a path management GUI or CLI; (2) another type of manager requiring storage path information directly from a host; and (3) a host information consolidator (as will be discussed below with respect to FIGS. 5-7). Accordingly, the host agent 230 may listen for storage path management commands 260 from managers 250 for processing at the host 210. The storage path management commands 260 may be forwarded to the multi-pathing driver 220, or other host-based resources, as multi-pathing driver commands 265 for execution on the host 210.

Figure 2B:
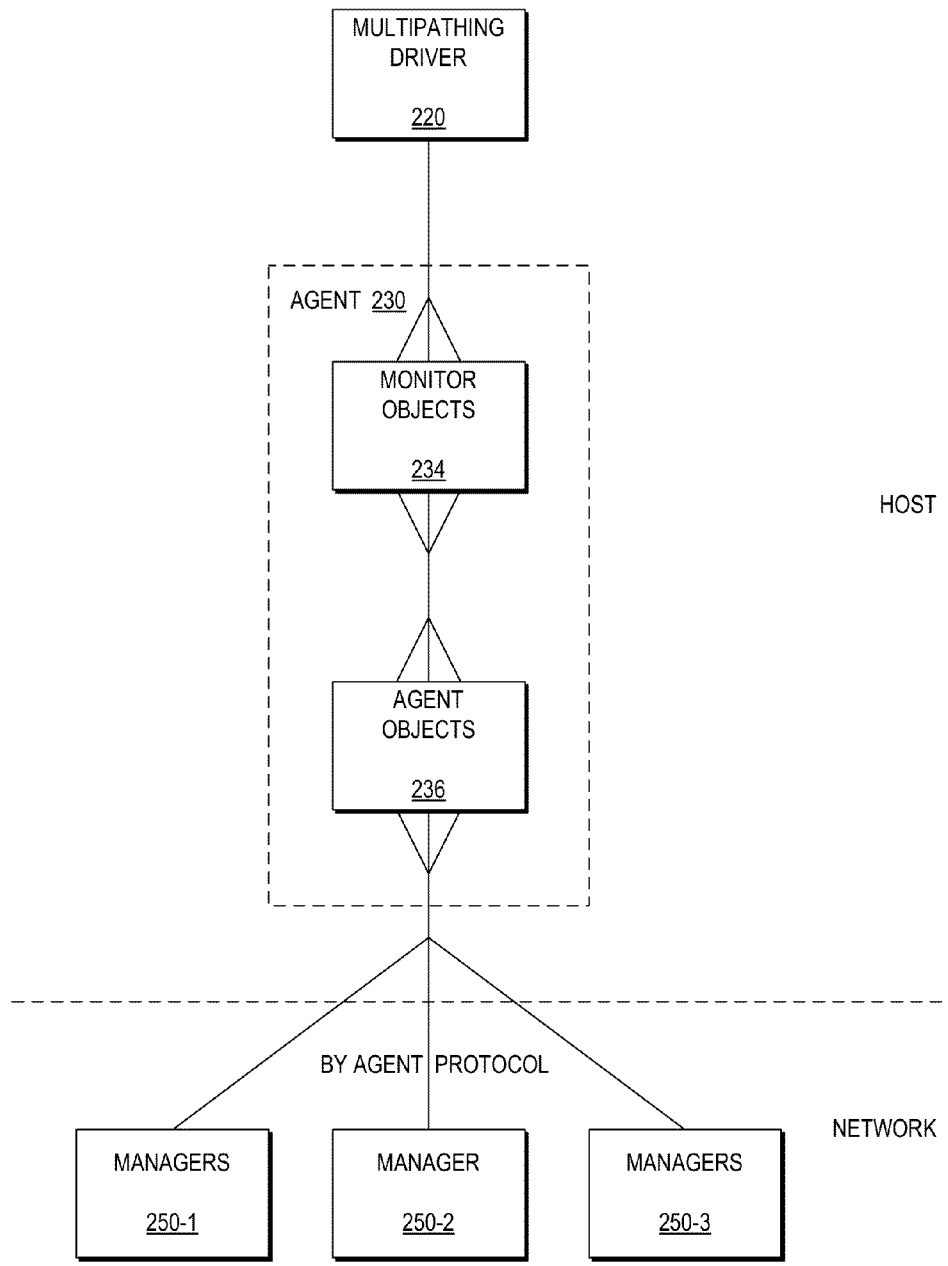
FIG. 2B is a block diagram illustrating a class design of the host agent.

FIG. 2B is a block diagram illustrating a class design of the host agent 230. Much of the flexibility provided by the host agent 230 arises from a class design consisting of sets of monitor objects 234 and agent objects 236. Each monitor object 234 listens for particular storage path information (e.g., storage path management events and storage path resource information) (i.e., a storage path management information type) from which it derives a unique alert (according to the storage path management information type) generated in a popular format, such as XML. Monitor objects 234 summarize, filter, aggregate, re-format, or pass through storage path information as-is for the storage path management information type, the result of which is the alert based on the storage path management information type.

Each agent object 236 further processes alerts from monitor objects 234 and forwards alerts for consumption by interested external managers 250-1, 250-2, 250-3 (250, generally), for example, according to a protocol understood by the listening management entities 250. Monitor objects 234 and agent objects 236 are in a many-to-many relationship, which essentially means multiple types of external managers 250 are free to monitor any and all storage path information in the multi-path kernel driver 220. This relationship is enabled by two primary queues, one for storage path information collected from the multi-path kernel driver 220, and the other for the alerts generated by the monitor objects 234.

Referring to FIGS. 2A and 2B, the management component also allows for active management of a multi-pathed host. External managers 250 send requests (i.e., storage path management commands 260) on demand to hosts 210 to either manage or retrieve detailed path information, for example. The agent objects 236 receive the storage path management commands 260 from managers 250 according to the protocol of the manager. It should be understood that, while the agent objects 236 are listening for storage path management commands 260 from the managers 250 according to a protocol, the agent objects 236 also may be listening for alerts customized by the monitor objects 234 for particular managers 250 according to the protocol. Accordingly, the class design consisting of sets of monitor objects 234 and agent objects 236 allows concurrent handling of requests 260 received from external managers 250 and processing of kernel path events (i.e., storage path information 225).

Figure 3:
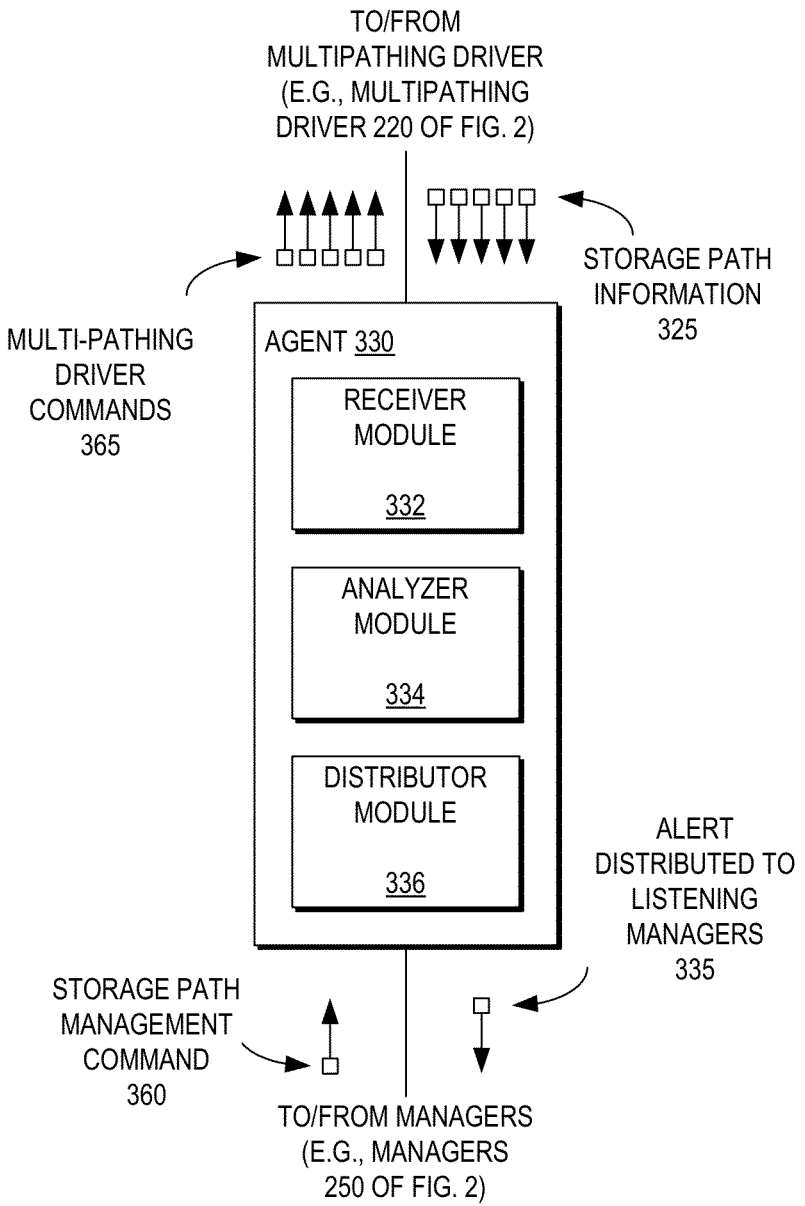

FIG. 3 is a block diagram illustrating a host agent 330 according to an example embodiment of the present invention. FIGS. 4A-4D are flow diagrams illustrating a method for distributing storage path information alerts according to an example embodiment of the present invention. FIGS. 3 and 4A-4D are described in conjunction below.

Figure 4D:
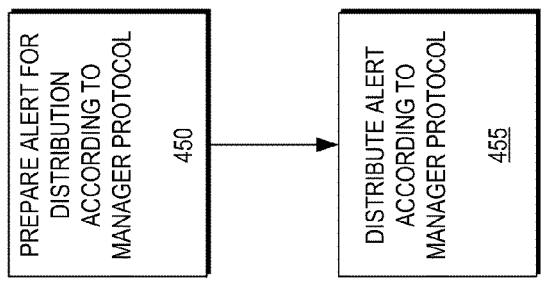
FIGS. 4A-4D are flow diagrams illustrating a method for distributing storage path information alerts according to an example embodiment of the present invention.
Figure 4C:
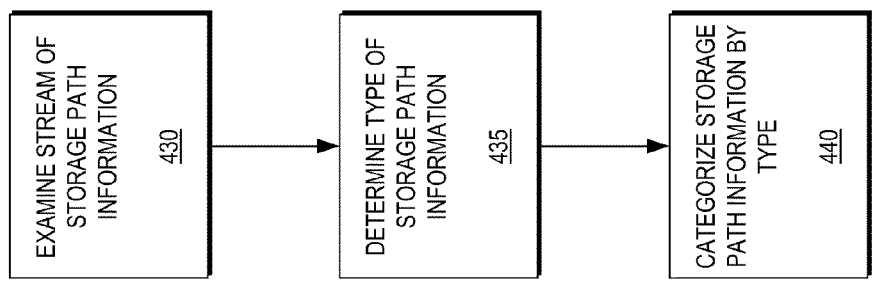
Figure 4B:
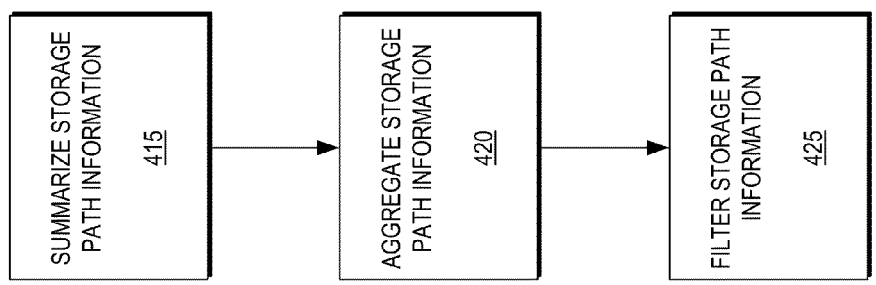
Figure 4A:
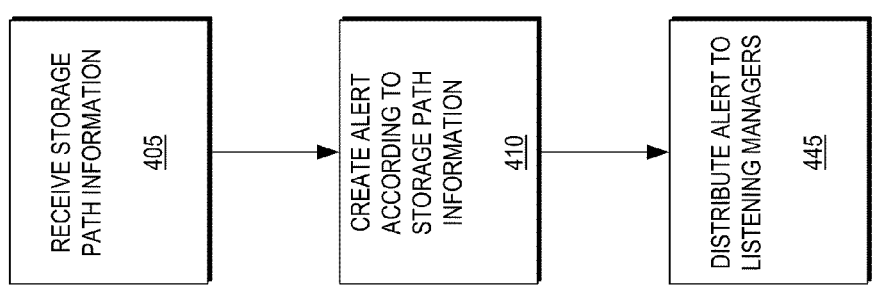

As illustrated in FIGS. 3 and 4A, a receiver module 332 of an agent 330 may receive storage path information 325 (405) (e.g., storage path management events and storage path resource information) from a multi-pathing driver (e.g., multi-pathing driver 220 of FIG. 2). An analyzer module 334 then may create an alert according to the storage path information (410). According to the alert (e.g., alert 227 of FIG. 2) created by the analyzer module 334, a distributor module 336 then may distribute the alert 335 to listening management entities (e.g., one or more of managers 150 of FIG. 1) in the multi-path storage environment (e.g., multi-path storage environment 100 of FIG. 1) (455).

As illustrated in FIGS. 3 and 4B, in certain embodiments, the analyzer module 334 may create the alert by analyzing the storage path information 325. For example, the analyzer module 334 may summarize the storage path information 325 (e.g., from each of a plurality of hosts) (415), aggregate the storage path information 325 (e.g., from the plurality of hosts) (420) and filter the storage path information 325 (e.g., according to a type of storage path information 325) (425). Example types of storage path information 325 include storage path management events and storage path resource information. Storage path management events may include, for example, path up, path down, all paths down, not all paths down, bus down, bus up, and policy change. Storage path resource information may include, for example, path added and path deleted. The distributor module 336 then may prepare the alert 335 for distribution, as illustrated in FIG. 4D.

As illustrated in FIGS. 3 and 4C., in certain embodiments, to filter the storage path information 325 (425), the analyzer module 334 may examine a stream of storage path information 325 (430), determine a type of storage path information for each item of storage path information 325 in the stream (435), and categorize the storage path information 325 according to the determined type (440).

As illustrated in FIGS. 3 and 4D, when distributing the alert 335 (445), the distributor module 336 may prepare the alert 335 for distribution to listening management entities in the multi-pathing environment according to a protocol understood by the listening management entities (450) and distribute the alert 335 to listening management entities in the multi-pathing environment according to the protocol understood by the listening management entities (455). The agent 330 then has transferred the alert 335 to management entities (e.g., manager 250 of FIG. 2) monitoring the type of storage path information in the alert 335.

In further embodiments, the agent 330 allows active management of multi-pathed hosts (e.g., host 110 of FIG. 1) by managers (e.g., manager 250 of FIG. 2). For example, the receiver module 332 may receive a storage path management command 360 from a manager 250 in a multi-path storage environment. The agent 330 then may engage host resources to process the storage path management request. It should be understood that, while the agent 330 is listening for storage path management commands 360 from the managers 250 according to a protocol, the agent 330 also may be listening for storage path information 325 from a multi-pathing driver (e.g., multi-pathing driver 220 of FIG. 2). Accordingly, the design of the agent 330 allows concurrent handling of storage path management commands 360 received from external managers 250 and processing of storage path information 325 from the multi-pathing driver 220.

Consolidator

Figure 5:
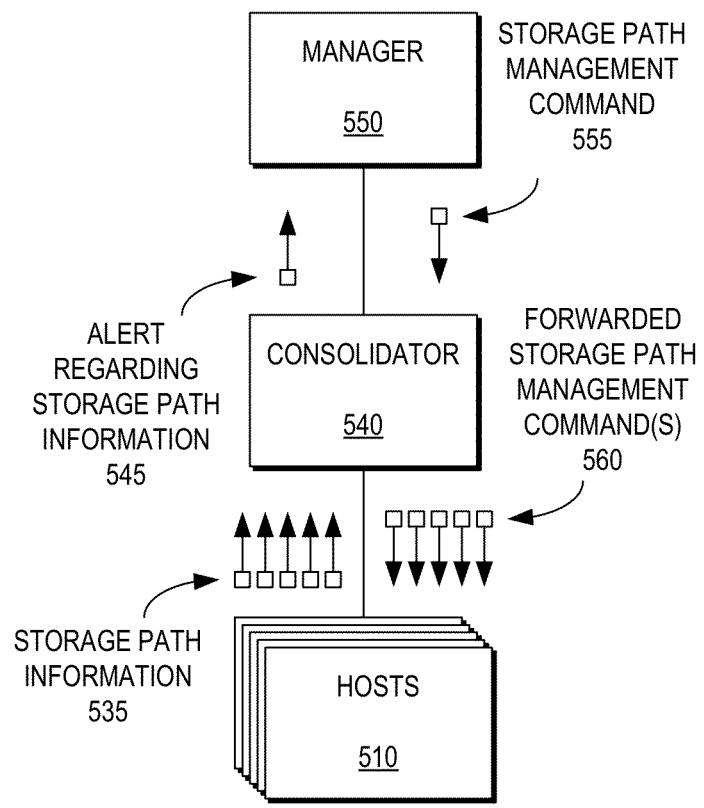
FIGS. 5 and 6 are block diagrams illustrating a consolidator according to example embodiments of the present invention.

FIG. 5 is a block diagram illustrating a consolidator 540 according to an example embodiment of the present invention. As illustrated in FIG. 5, a host information consolidator 540 collects storage path information 535 (e.g., storage path management events and storage path resource information) from hosts 510. For example, the consolidator 540 may collect storage path information 535 in a standard management format, such as Common Information Model (CIM) (e.g., Desktop Management Task Force (DMTF) and Storage Management Initiative—Specification (SMI-S) distributed by the Storage Networking Industry Association (SNIA).

The consolidator 540 may provide at least the following functionality with respect to storage path information 535: (1) as a single-point-of-access aggregator for a path management GUI or CLI so that the latter need only connect to the consolidator 540 to access a range of hosts 510, and so that hosts 510 need only interact with a single entity (i.e., the consolidator 540) rather than each manager 550; (2) as a repository of storage path information 535 (e.g., current topology and configuration information, and historical information about events, alerts and performance, as well as configuration changes) stored in a repository 649 of FIG. 6, for example, for consumption by managers 550 connecting to the consolidator 540 after the fact of the original storage path information; and (3) as a services provider offering management of multi-pathing and other host-based services, including active management command 555 handling and web services, to managers 550 higher up the information chain over RESTful interfaces, for example.

Accordingly, the consolidator 540 may listen for storage path management commands 555 from managers 550 for forwarding, via aggregation, processing and distribution, as storage path management commands to hosts 510 for processing.

Figure 6:
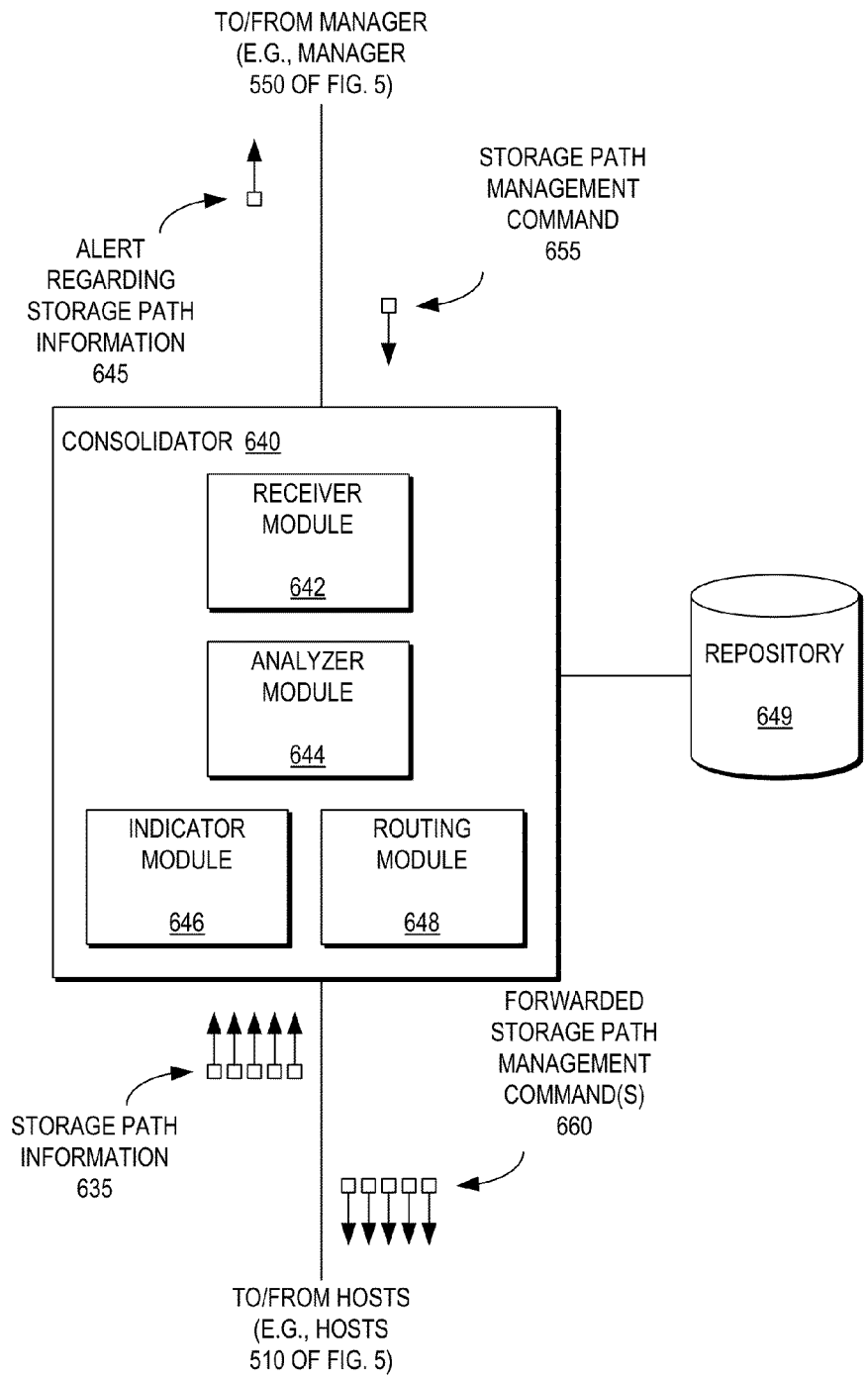

FIG. 6 is a block diagram illustrating a consolidator 640 according to an example embodiment of the present invention. FIGS. 7A-7D are flow diagrams illustrating a method for consolidating storage path information according to an example embodiment of the present invention. FIGS. 6 and 7A-7D are described in conjunction below.

Figure 7D:
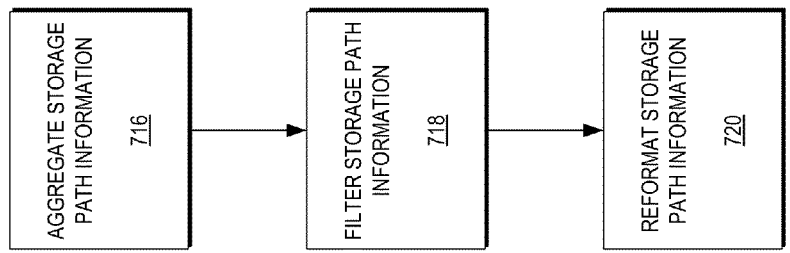
FIGS. 7A-7D are flow diagrams illustrating a method for consolidating storage path information according to an example embodiment of the present invention.
Figure 7C:
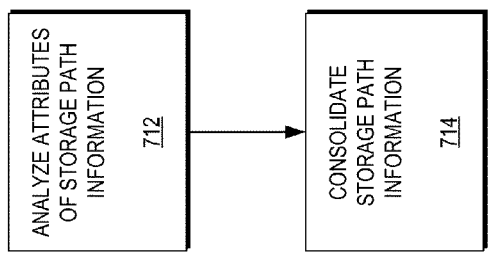
Figure 7B:
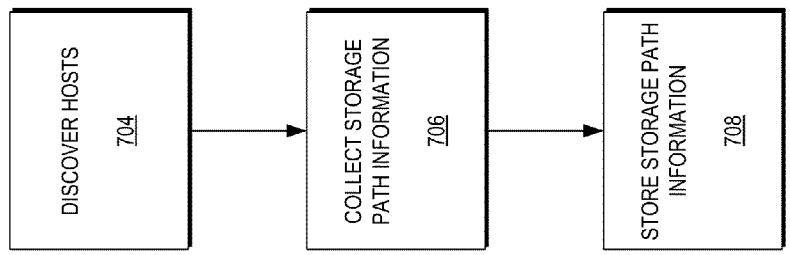
Figure 7A:
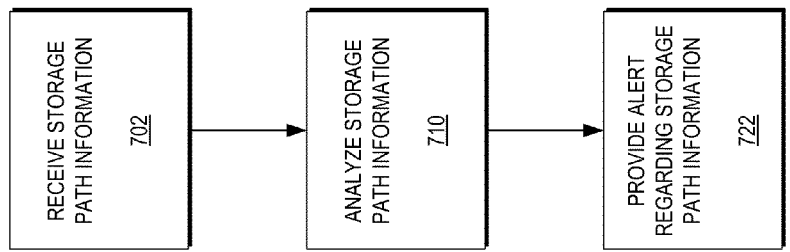

As illustrated in FIGS. 6 and 7A, a receiver module 642 of the consolidator 640 may receive storage path information 635 (702) (e.g., storage path management events and storage path resource information) from a host (e.g., host 510 of FIG. 5). An analyzer module 644 then may analyze the storage path information 635 (710). According to the analysis by the analyzer module 644, an indicator module 646 then may provide an alert 645 regarding the storage path information 635 (722).

As illustrated in FIGS. 6 and 7B, to receive storage path information (702), the receiver module 642 may discover hosts 510 supporting the multi-pathing environment (e.g., multi-path storage environment 100 of FIG. 1) (704), collect storage path information 635 from the hosts (706), and store the storage path information 635 in, for example, a secure and highly available repository 649 (708).

As illustrated in FIGS. 6 and 7C, in certain embodiments, to analyze the storage path information 635 (710), the analyzer module 644 may analyze attributes of the storage path information 635 (712) and consolidate storage path information 635 having a common attribute (714). As illustrated in FIGS. 6 and 7D, in other embodiments, the analyzer module 644 may aggregate the storage path information 635 (716), filter the storage path information 635 according to at least one attribute (718), and reformat the filtered storage path information 635 to serve enterprise management needs and policies (720)

In further embodiments, the indicator module 646 may forward the consolidated storage path information 635 according to the attribute, such as to a manager listening for storage path information conforming to the attribute. FIGS. 7E-7H are flow diagrams illustrating a method for forwarding (i.e., delivering) storage path management commands according to an example embodiment of the present invention. FIGS. 6 and 7E-7H are described in conjunction below.

Figure 7H:
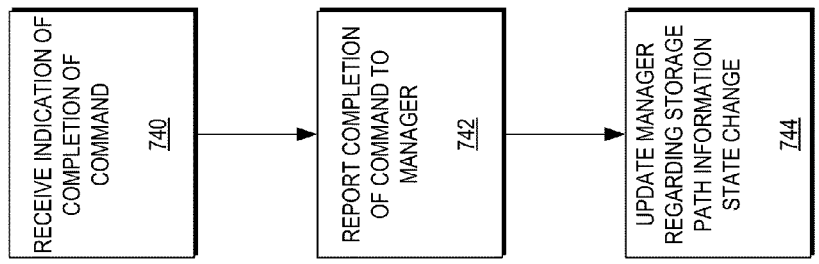
FIGS. 7E-7H are flow diagrams illustrating a method for forwarding storage path management commands according to an example embodiment of the present invention.
Figure 7G:
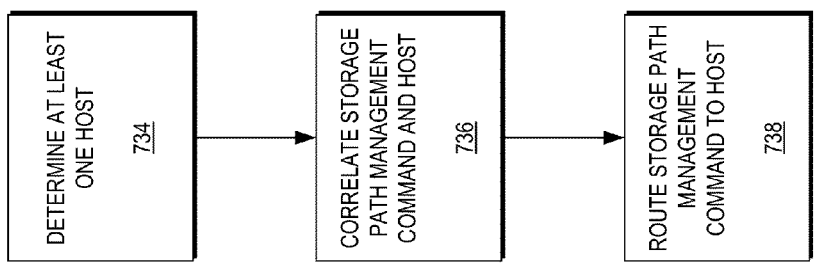
Figure 7F:
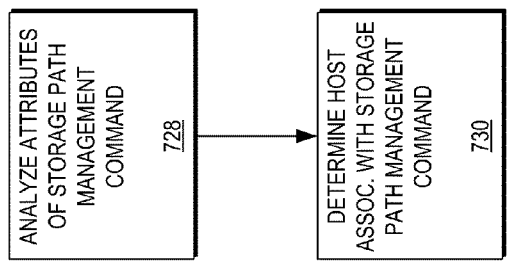
Figure 7E:
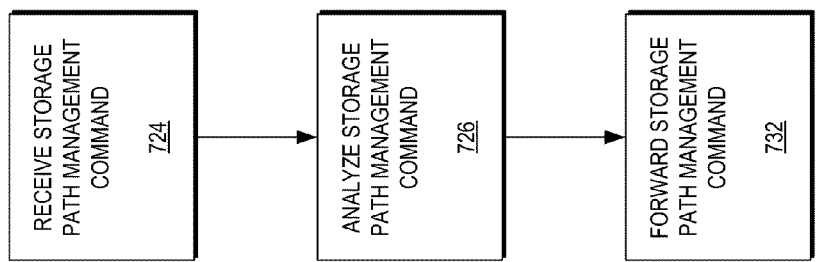

As illustrated in FIGS. 6 and 7E, a receiver module 642 of the consolidator 640 may receive a storage path management command 660 associated with storage path information (724) (e.g., storage path management events and storage path resource information) from a manager (e.g., manager 550 of FIG. 5). An analyzer module 644 then may analyze the storage path management command 660 to determine hosts (e.g., hosts 510 of FIG. 5) associated with the storage path command (726). A routing module 648 then may forward (i.e., deliver) the storage path management command 660 to at least one host according to the analysis (732). As illustrated in FIGS. 6 and 7F, in certain embodiments, to analyze the storage path management command 660 (726), the analyzer module 644 may analyze attributes of the storage path management command 660 (728) and determine at least one host associated with the storage path management command 660 according to the analyzed attributes (730).

As illustrated in FIGS. 6 and 7G, in certain embodiments, to forward the storage path management command 660 to at least one host according to the analysis (732) the routing module 648 may determine at least one host associated with the storage path command (734), correlate the storage path management command 660 and the at least one host according to the storage path information (736), and route the storage path management command 660 to the at least one host (738). As illustrated in FIGS. 6 and 7H, in other embodiments, the receiver module 642 may receive an indication from the at least one host of completion of the command (740). The consolidator 640 then may report completion of the command to a manager that issued the command (742) via an indicator module 646. The indicator module 646 further may update the manager regarding a storage path information state change resulting from completion of the command at the at least one host (744). Additionally, in other embodiments, the state change update may be sent to managers other than the one that issued the command.

Storage path management commands 655 may include active management commands of the multi-pathing driver, such as PowerPath by EMC Corporation of Hopkinton, Mass.

Active management includes, for example, turning on or off performance monitoring, setting thresholds for events, such as latency monitoring threshold, turning on or off other features, setting other parameters on the host, setting multi-pathing policy, or other multi-pathing related items. Active management commands also can be used to manage other aspects of filter drivers on the host, (other than multi-pathing) such as turning encryption on or off for a logical unit or managing migrations through a tool, such as PowerPath Migration Enabler by EMC Corporation of Hopkinton, Mass.

Remote active management through the consolidator 640 provides a number of advantages. For example, the consolidator 640 can provide a central point for security (e.g., authentication and authorization) for remote active management. The consolidator 640 also can perform complex commands that need to have participation from multiple hosts 610, such as setting a latency monitoring threshold on a number of hosts grouped together by common purpose. As understood in the art, routing of a command to hosts is particularly hard with traditional management software. Take, for example, a scenario of disabling an array port prior to a maintenance operation when that array port is connected to many hosts. Traditionally, one uses array management software to identify the array port. However, there is no easy way to find all the hosts connected to that array port. Even if one is able to determine all the hosts connected to the array port, one has to execute the disable port command individually on each of the hosts.

Example embodiments of the present invention, however, provide the ability to send one command to the consolidator and have the command execute on all the relevant hosts. For example, the consolidator 640 may first check that all hosts have access to all relevant devices (i.e., devices accessed through that array port) through some other array port and that multi-pathing policies are configured correctly. The consolidator 640 then may issue the command to each host to disable the array port. Additionally, the consolidator 640 may send the command to hosts that may have been down when the command originally was issued, thereby ensuring that the command is issued to such hosts when they come back up. Further, a second complex command can be handled to reverse the process of disabling the array port once the maintenance operation has been completed.

Viewer

Figure 8:
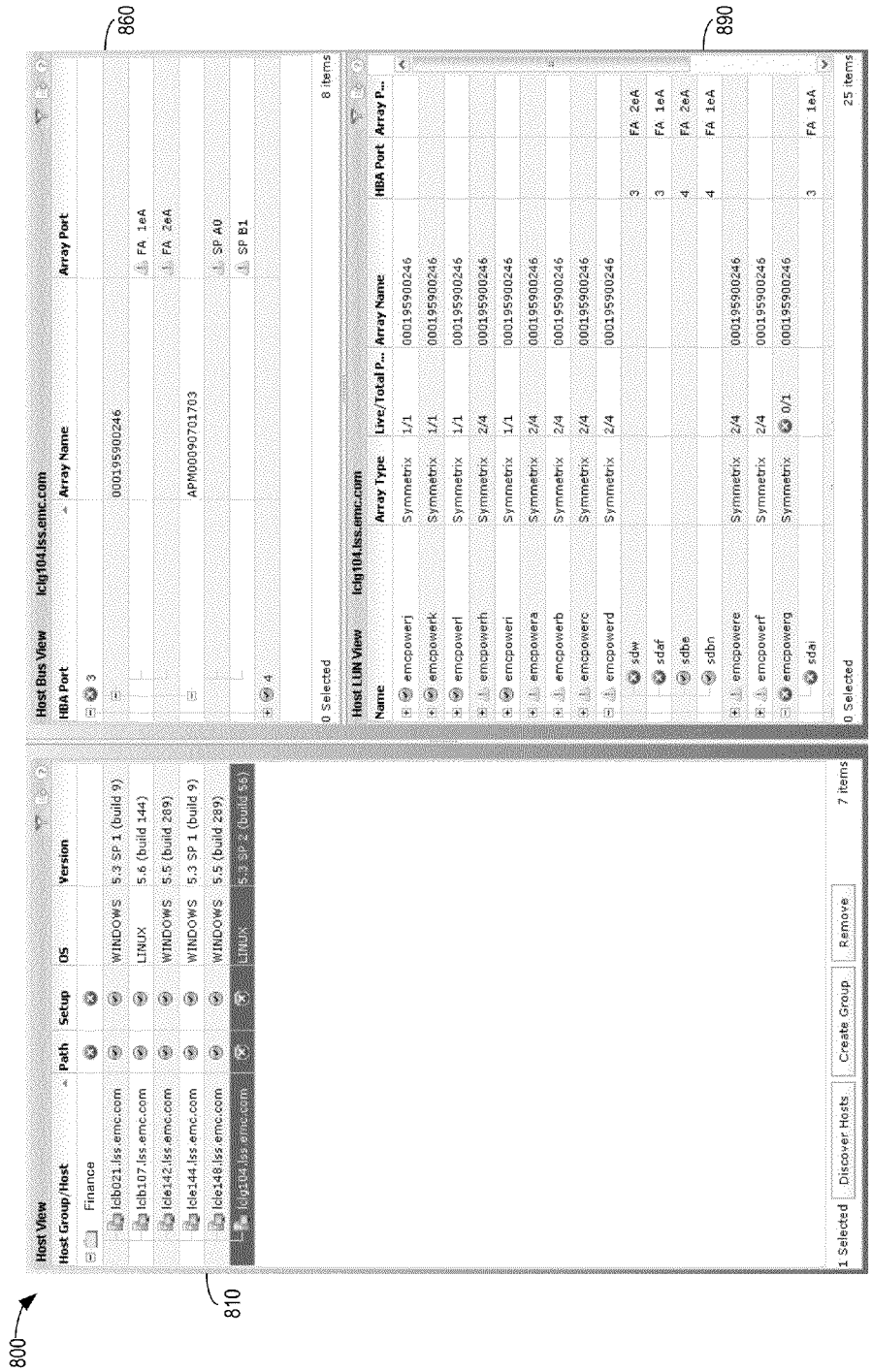
FIG. 8 is a diagram illustrating a screen shot of a storage path management application according to an example embodiment of the present invention, including a host view component and a host bus view component.

FIG. 8 is a diagram illustrating a screen shot of a storage path management application 800 according to an example embodiment of the present invention. The storage path management application 800 may be EMC PowerPath Viewer by EMC Corporation of Hopkinton, Mass. As will be described below in greater detail, the host view component 810 and the host bus view component 860 afford an administrator a high degree of control over a multi-path storage environment. The storage path management application 800 is divided into three panes, Host View 810, Host Bus View 860, and Host LUN View 890.

As used herein, "bus" refers to two connected SAN edge points (e.g., fibre channel fabric N-port addresses) in the storage configuration, such as an HBA port on a host on one end and an array port on the other. As used herein, "path" refers to the physical or virtual route between a host and a storage system LUN, including the HBA port, cables, a switch, a storage system interface and port, and an LU. Typically, multiple paths traverse a single bus. As a result, a bus failure is usually accompanied by multiple path failures.

The storage path management application 800 enables an administrator to view and monitor a plurality of multi-path hosts through a GUI. In certain embodiments, the storage path management application 800 allows viewing and monitoring of up to 500 hosts. The storage path management application 800 provides interfaces for viewing hosts, host groups, buses, LUNs, and individual paths to each LUN. The storage path management application 800 presents the information in windows and panes (i.e., Views) which an administrator may use to organize multi-path environment information in a customized manner.

In certain embodiments, the storage path management application 800 alerts administrators to changes in the status of multi-path devices through two monitors (not shown): Path Alert Monitor, for changes in paths and LUNs; and Bus Alert Monitor, for changes in a bus. Additionally, in other embodiments, the storage path management application 800 may send emails to an administrator or another user when an alert is detected.

Table 1, below, describes the main tasks that are carried out using the storage path management application 800 and the Views where they are carried out:

TABLE 1

Views used for storage path management tasks.

| Task | Description | Carried out in . . . |
|---|---|---|
| Discover and monitor hosts | Monitor status of I/O access on PowerPath hosts | Host View |
| Monitor buses | Monitor status of I/O access on HBA ports and array ports | Host Bus View |
| Monitor LUNs and paths | Monitor status of I/O access on LUNs and paths | Host LUN View |
| Manage alerts | Monitor and respond to alerts of change in I/O access to PowerPath hosts, buses, LUNs, and paths | Alert Monitor, Bus Alert Monitor |
| Manage email | Configure email addressee and return address list for alerts that are sent to the Alert Monitor or Bus Alert Monitor | Preferences |

The storage path management application 800 also provides filter function that is similar to an advanced search. For example, the storage path management application 800 matches the text that is typed in a filter field first by columns that are searchable by text. Additional criteria may be provided, such as via a drop-down list, for further filter results. The storage path management application 800 filters out rows that do not contain text specified in the filter field by the criteria selected in the drop-down list, leaving in the selected View (i.e., the View for which the filter icon was clicked) only those rows that contain matches for the selected text and other selected criteria. The filter criteria exist for all the Host View, the Host Bus View, and the Host LUN View.

The Host View contains another set of filter criteria related to the status of the multi-path hosts, paths, and policy. The criteria are: All (default), Setup Error, Setup Warning, Path Error, and Path Warning. The LUN View contains a similar set of filter criteria related to the status of the multi-path managed LUNs. The criteria are: All (default), LUN Warning, and LUN Failure. These filters criteria filter at the level chosen and any levels beyond the level chosen. For example, filtering by Path Warning returns rows with hosts experiencing both path warning and path failure in Host View.

Host View

Figure 9:
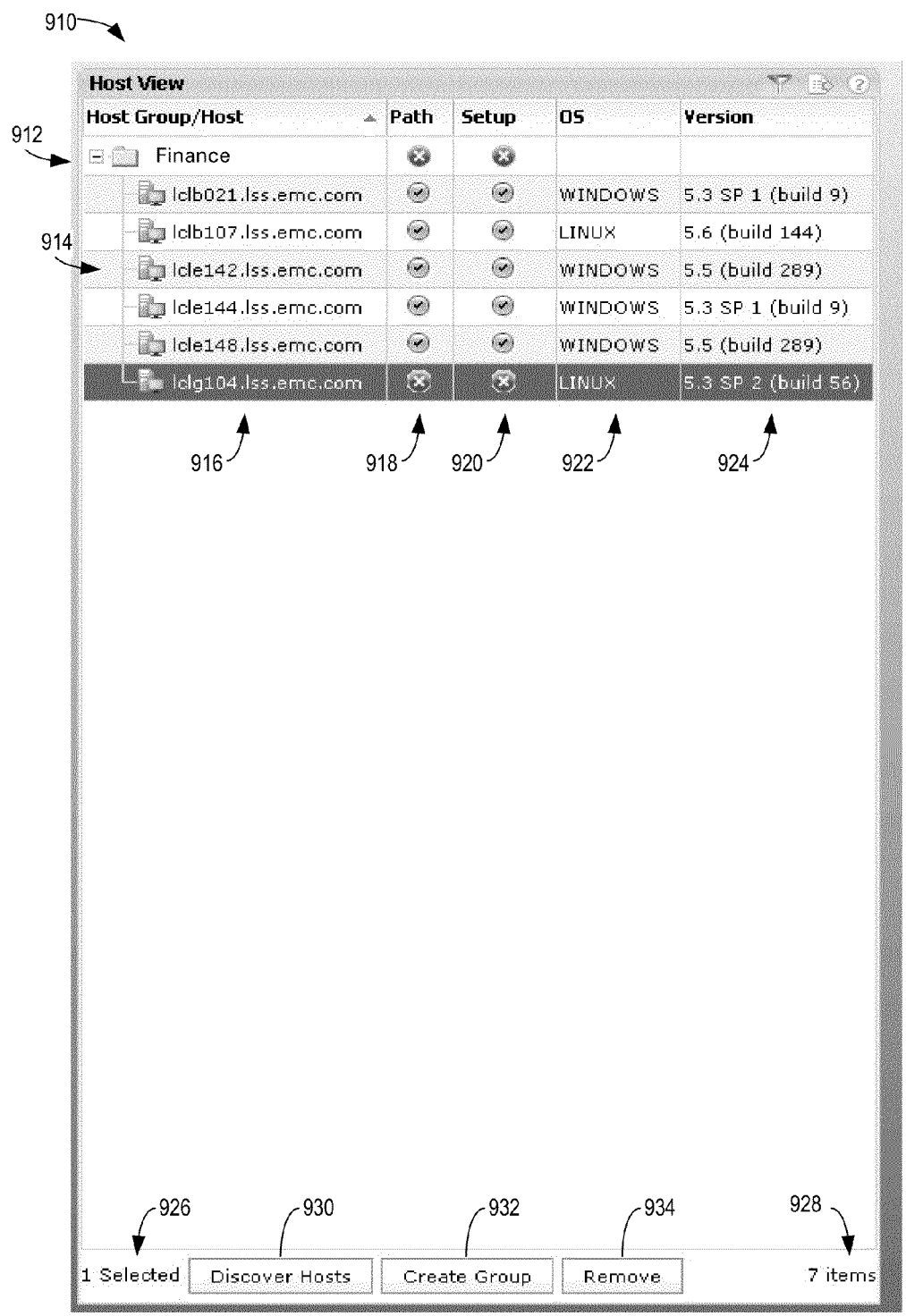
FIG. 9 is a diagram illustrating a screen shot of a host view component of a storage path management application according to an example embodiment of the present invention.

FIG. 9 is a diagram illustrating a screen shot of a host view component 910 of a storage path management application (e.g., as illustrated in the screen shot 800 of FIG. 8) according to an example embodiment of the present invention. The graphical perspective provided by the host view component 910 allows analysis of the multi-path storage environment (e.g., multi-path storage environment 100 of FIG. 1) at a glance by displaying a summary of the path states to the LU, along with validating the setup of the environment.

The basic tasks carried out from the Host View include: (1) Viewing and monitoring multi-path hosts 914 and host groups 912; (2) Discovering multi-path hosts 930 for viewing within the storage path management application 800 (i.e., going through a process of recognizing hosts that the storage path management application 800 already manages on the network); (3) Creating host groups 932 for organizing within the storage path management application 800; and (4) Removing multi-path hosts and host groups 934 for viewing within the storage path management application 800.

As illustrated in FIG. 9, the host view component 910 includes information columns relating to hosts and host groups 916, path state 918, path setup state 920, host operating system 922, and host multi-path driver version 924.

The host group/host column 916 provides a name of a multi-path host group (e.g., a business unit, "Finance"). A host group is a group of multi-path hosts that are gathered together for organizing within the storage path management application. When the host group is expanded, the host group/host column 916 displays the name of each multi-path host in the group (e.g., lclb021.lss.emc.com and lclb107.lss.emc.com). In certain embodiments, the hostname is not assigned through the storage path management application or through the multi-path host discovery process. It should be noted that changes to the hostname or Internet protocol (IP) address of a host may require deletion and rediscovery of the host.

The path column 918 provides an indication of the state of LUNs in the host group and for each host.

The setup column 920 provides an indication of the condition or health of a failover policy for the host; that is, whether the host group or host is operating in an optimal failover policy for its licensed state. The setup column also provides an indication of the state of paths to LUNs in the host group and the condition or health of path-to-LUN configuration ratio.

The operating system 922 and version 924 columns provide an indication of the operating system running on the multi-path hosts within the host group and the version and build of the multi-path driver running on the multi-path hosts with the host group, respectively.

The host view component 910 receives information for display, for example, from a consolidator (e.g., consolidator 640 of FIG. 6). Individual hosts 914 are displayed in rows, with hosts 914 being grouped 912 according to an attribute, such as by user preference. For example, as illustrated in FIG. 9, hosts 916 are grouped according to a business unit, "Finance".

The analysis of the path state and path setup state is provided at multiple levels (e.g., individual host level and host group level). Each host running a multi-path driver is provided its own row in the table. Each host belongs to one or more groups in the table, each of which may have many members.

Table 2, below, illustrates each path state and icon, along with a description of the path state at the host level and the host group level. Similarly, Table 3, below, illustrates each path setup state and icon, along with a description of the path setup state at the host level and the host group level.

TABLE 2

Path state information.

| Path State/ Icon Description | Host-level Description | Host Group-level Description |
|---|---|---|
| OK/ Check Mark | All LUNs are accessible All paths are alive | All hosts are responding. All LUNs are operational; there is full I/O access on all LUNs. All host paths are alive |
| Warning/ Exclamation Point | All LUNs are accessible but there is degraded LUN I/O access. One or more paths are dead. No LUNs are configured | All hosts are responding. One or more hosts have degraded LUN I/O access |
| Unknown/ Question Mark | No LUN information is available No path information is available | One or more hosts are not responding |
| Critical/ X | One or more LUNs are not accessible | |

TABLE 3

Path setup state information.

| Path Setup State/ Icon Description | Host-level Description | Host Group-level Description |
|---|---|---|
| OK/ Check Mark | Host has a valid license Host is connected to viewer application Heartbeat is coming from host Host running optimal load-balancing policy All paths are configuration compliant (e.g., more than one path is configured to the LUN) | All hosts are OK |
| Warning/ Exclamation Point | Host license expires within a set period No LUNs are configured | One or more hosts are in a Warning state |
| Unknown/ Question Mark | Host is not responding to TCP connection attempts | One or more hosts not responding All other hosts are OK or in a Warning state |
| Critical/ X | One or more hosts have an error with respect to setup Host license is expired No multi-path driver Multi-path driver not running Only one path is configured to the LUN Only one path is accessible to one or more LUNs, its other paths having failed | One or more hosts are in a Critical state |

Accordingly, when the Host Group node 912 is collapsed, the icons in the path state column 918 and the path setup state column 920 represent the most severe state for hosts 914 contained within that host group 912. The precedence for most- to least-critical is: Critical, Unknown, Warning, and OK.

FIGS. 10A-10G are flow diagrams illustrating a method for providing an indication regarding a host path state and a host path setup state according to an example embodiment of the present invention. As described above, the host view component 910 receives information for display, for example, from a consolidator (e.g., consolidator 640 of FIG. 6). Accordingly, the flow diagrams of FIGS. 10A-10G are described below in conjunction with the block diagram of FIG. 6.

As illustrated in FIG. 10A, a receiver module 642 may receive host path state information (e.g., alert regarding storage path information 645 of FIG. 6) (1002) and host path setup state information (e.g., alert regarding storage path information 645 of FIG. 6) (1004) in a multi-path storage environment (e.g., multi-path storage environment 100 of FIG. 1). An analyzer module 644 then may analyze the received host path state information and the received host path setup state information (1006). According to the analysis by the analyzer module 644, an indicator module 646 then may provide an alert regarding a host path state (e.g., host path state 918 of FIG. 9) for a host and a host path setup state (e.g., host path setup state 920) for the host according to the analyzed host path state information (1080).

In certain embodiments, the receiver module 642 may receive an indication of whether the host path experiences a fault and receive an indication of whether the host path is multi-pathed properly and whether a load balancing policy for the host path is optimal according to the multi-pathing license for the host, as illustrated above in Table 2 and Table 3. Further, as illustrated in FIG. 9, the analyzer module 644 may group at least one host according to an attribute common to the at least one host.

As illustrated in FIGS. 6 and 10B, the analyzer module 644 may determine a host path state for each host in a group of at least one host (1008) and set a group path state for the group of at least one host according to the determined host path state for each host in the group of at least one host (1026).

Figure 10C:
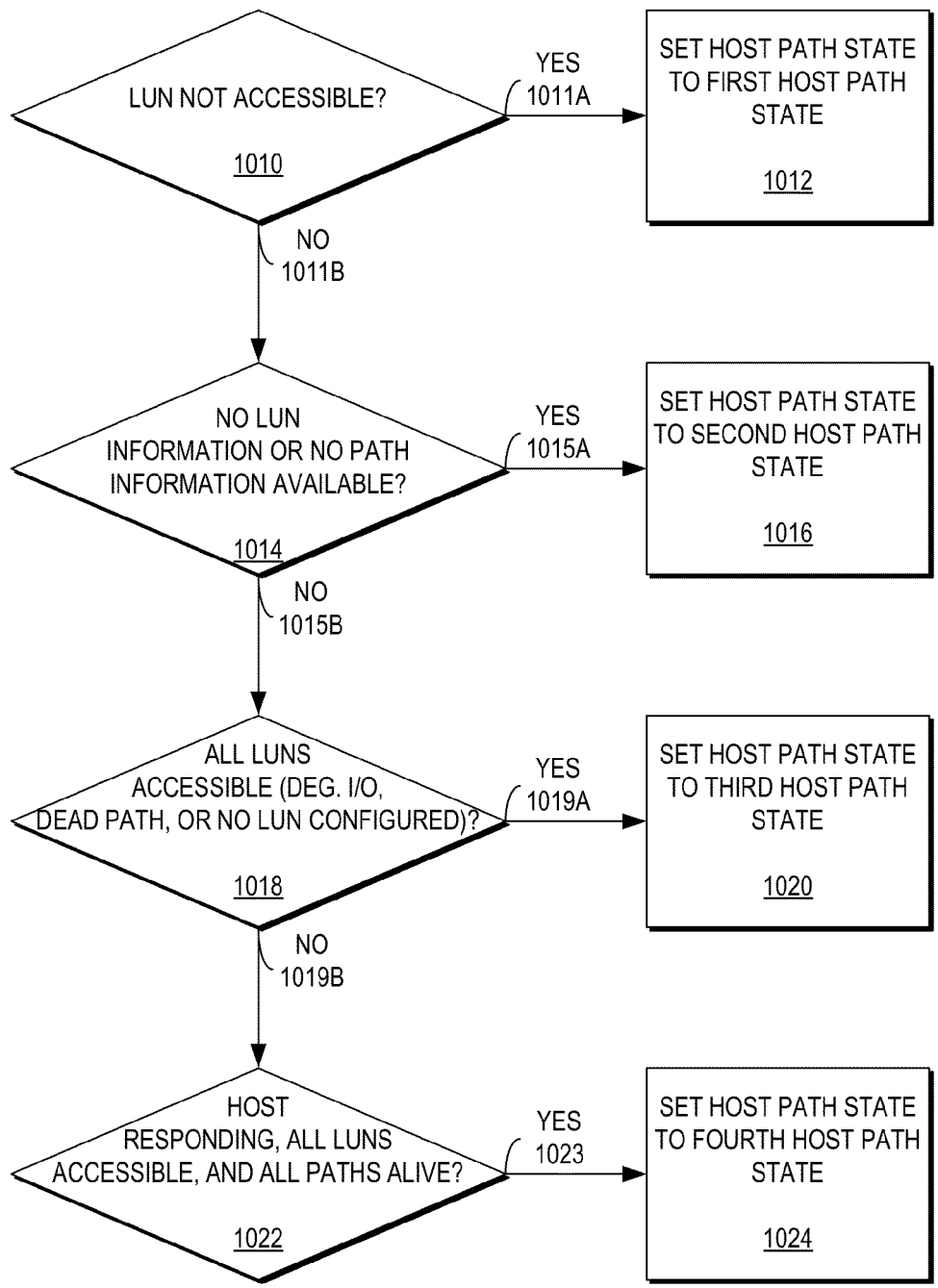

As illustrated in FIGS. 6 and 10C, to set a host path state for each host of the group of at least one host according to the determined host path state for each host in the group of at least one host (1026), the analyzer module 644 determines whether one or more LUNs are not accessible (1010). If one or more LUNs are not accessible (1011A), the analyzer module 644 sets the host path state to a first host path state (1012) (i.e., critical).

Otherwise (1011B), the analyzer module 644 determines whether no LUN information is available or no path information is available (1014). If no LUN information is available or no path information is available (1015A), the analyzer module 644 sets the host path state to a second host path state (1016) (i.e., unknown).

Otherwise (1015B), the analyzer module 644 determines whether all LUNs are accessible and if there is degraded LUN I/O access, one or more paths are dead or no LUNs are configured (1018). If all LUNs are accessible and there is degraded LUN I/O access, one or more paths are dead or no LUNs are configured (1019A), the analyzer module sets the host path state to a third host path state (1020) (i.e., warning).

Otherwise (1019B), the analyzer module determines whether the host is responding, all LUNs are accessible and all paths are alive (1022). If the host is responding, all LUNs are accessible and all paths are alive (1023), the analyzer module 644 sets the host path state to a fourth host path state (i.e., OK).

While the preceding four conditional statements 1010, 1014, 1018, 1022 should catch all host path states, an error may be thrown if a host path state does not conform to one of the conditions.

Figure 10D:
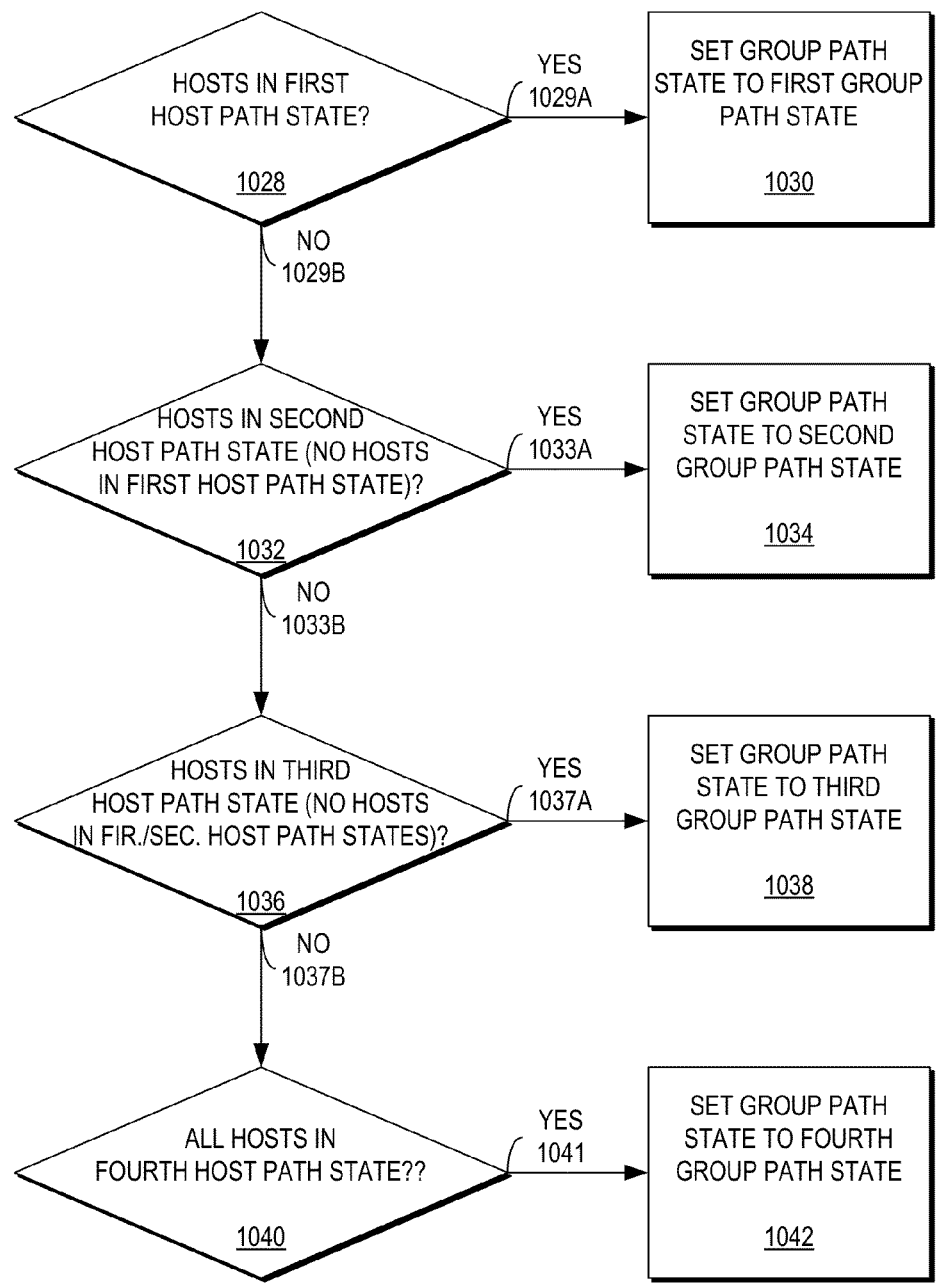

As illustrated in FIGS. 6 and 10D, to set a group path state for the group of at least one host according to the determined host path state for each host in the group of at least one host (1026), the analyzer module 644 determines whether one or more hosts are in the first host path state (i.e., critical) only (1028). If one or more hosts are in the first host path state only (1029A), the analyzer module 644 sets the group path state to a first group path state (1030) (i.e., critical).

Otherwise (1029B), the analyzer module 644 determines whether one or more hosts are in the second host path state (i.e., unknown) and no hosts are in the first host path state (i.e., critical) (1014). If one or more hosts are in the second host path state (i.e., unknown) and no hosts are in the first host path state (i.e., critical) (1033A), the analyzer module 644 sets the group path state to a second group path state (1034) (i.e., unknown).

Otherwise (1033B), the analyzer module 644 determines whether one or more hosts are in the third host path state (i.e., warning), no hosts are in the first host path state (i.e., critical) and no hosts are in the second host path state (i.e., unknown) (1036). If one or more hosts are in the third host path state (i.e., warning), no hosts are in the first host path state (i.e., critical) and no hosts are in the second host path state (i.e., unknown) (1037A), the analyzer module sets the group path state to a third group path state (1038) (i.e., warning).

Otherwise (1037B), the analyzer module determines whether all hosts are in the fourth host path state (1040). If all hosts are in the fourth host path state (1041), the analyzer module 644 sets the group path state to a fourth group path state (i.e., OK).

While the preceding four conditional statements 1028, 1032, 1036, 1040 should catch all host path state combinations, an error may be thrown if a host path state does not conform to one of the condition combinations.

As illustrated in FIGS. 6 and 10E, the analyzer module 644 may determine a host path setup state for each host in a group of at least one host 1044) and set a group path setup state for the group of at least one host according to the determined host path setup state for each host in the group of at least one host (1062).

Figure 10F:
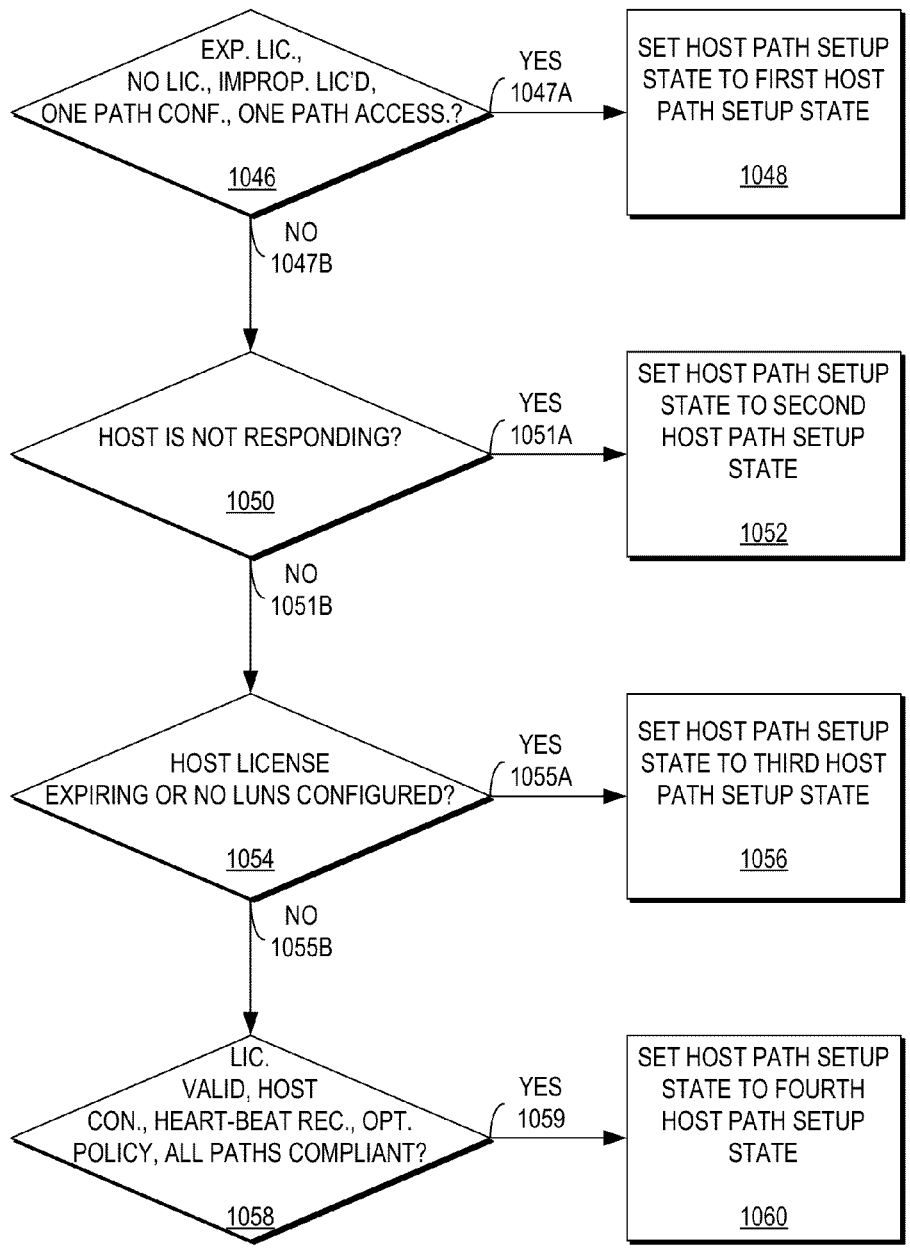

As illustrated in FIGS. 6 and 10F, to set a group path setup state for the group of at least one host according to the determined host path setup state for each host in the group of at least one host (1062), the analyzer module 644 determines whether the host has an expired license, the host does not have a license, the host is improperly licensed, only one path is configured to the LUN or only one path of a plurality of configured paths is accessible to one or more LUNs (1046). If the host has an expired license, the host does not have a license, the host is improperly licensed, only one path is configured to the LUN or only one path of a plurality of configured paths is accessible to one or more LUNs (1047A), the analyzer module 644 sets the host path setup state to a first host path setup state (i.e., critical) (1048).

Otherwise (1047B), the analyzer module 644 determines whether the host is not responding (1050). If the host is not responding to connection requests (1051A), the analyzer module 644 sets the host path setup state to a second host path setup state (i.e., unknown) (1052).

Otherwise (1051B), the analyzer module 644 determines whether the host has a license scheduled to expire within a predetermine period of time or no LUNs are configured (1054). If the host has a license scheduled to expire within a predetermine period of time or no LUNs are configured (1055A), the analyzer module 644 sets the host path setup state to a third host path setup state (i.e., warning) (1056).

Otherwise (1055B), the analyzer module 644 determines whether the host has a valid license, the host is connected to a management application, a heartbeat is received from the host, the host is running an optimal load-balancing policy or all paths are configuration-compliant (1058). If the host has a valid license, the host is connected to a management application, a heartbeat is received from the host, the host is running an optimal load-balancing policy and all paths are configuration-compliant (1059), the analyzer module 644 sets the host path setup state to a fourth host path setup state (i.e., OK) (1060).

While the preceding four conditional statements 1046, 1050, 1054, 1058 should catch all host path setup states, an error may be thrown if a host path setup state does not conform to one of the conditions.

Figure 10G:
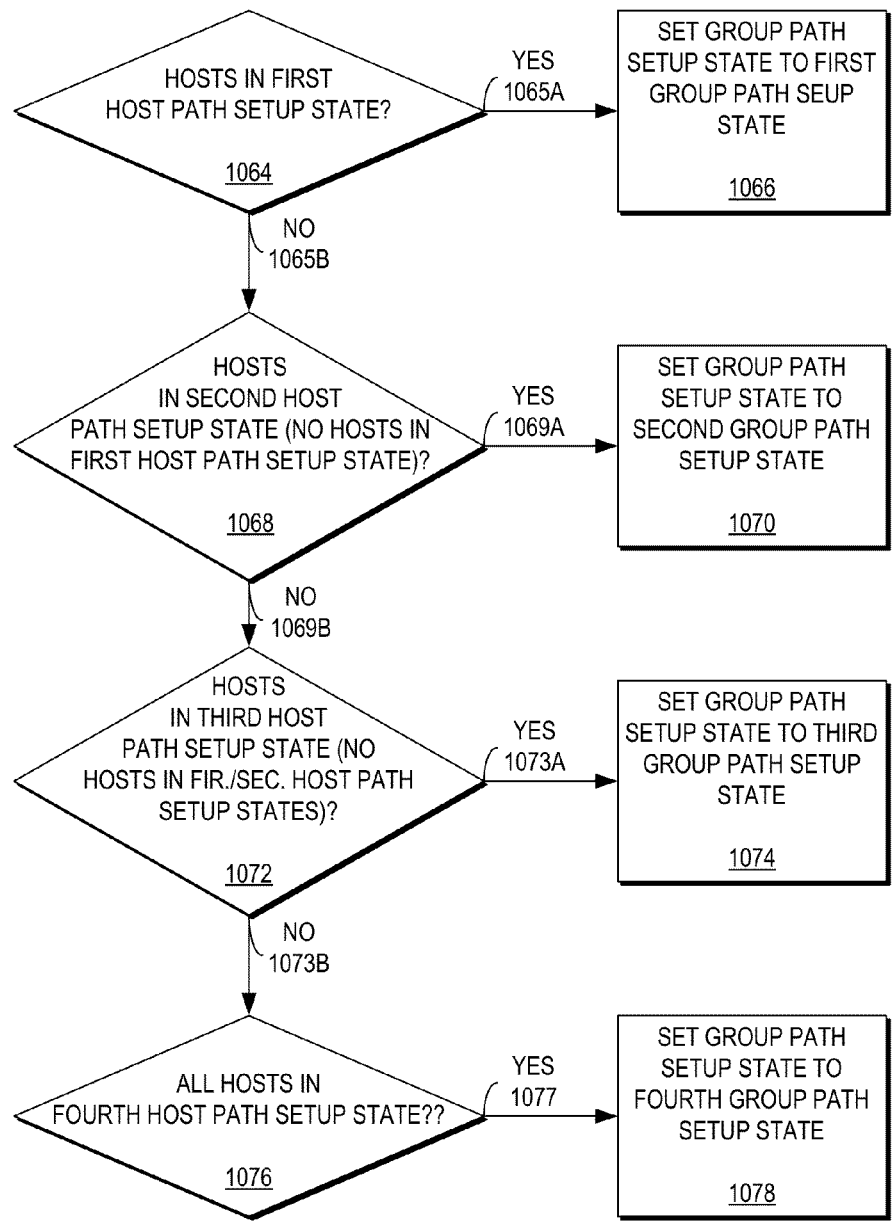

As illustrated in FIGS. 6 and 10G, to set a group path setup state for the group of at least one host according to the determined host path setup state for each host in the group of at least one host (1062), the analyzer module 644 determines whether one or more hosts are in the first host path setup state (i.e., critical) (1064). If one or more hosts are in the first host path setup state (i.e., critical) (1065A), the analyzer module 644 sets the group path setup state to a first group path setup state (1066).

Otherwise (1065B), the analyzer module 644 determines whether one or more hosts are in the second host path setup state (i.e., unknown) and no hosts are in the first host path setup state (i.e., critical) (1068). If one or more hosts are in the second host path setup state (i.e., unknown) and no hosts are in the first host path setup state (i.e., critical) (1069A), the analyzer module 644 sets the group path setup state to a second group path setup state (i.e., unknown) (1070).

Otherwise (1069B), the analyzer module 644 determines whether one or more hosts are in the third host path setup state (i.e., warning), no hosts are in the first host path setup state (i.e., critical) and no hosts are in the second host path setup state (i.e., unknown) (1072). If one or more hosts are in the third host path setup state (i.e., warning), no hosts are in the first host path setup state (i.e., critical) and no hosts are in the second host path setup state (i.e., unknown) (1073A), the analyzer module 644 sets the group path setup state to a third group path setup state (i.e., warning) (1074).

Otherwise (1073B), the analyzer module 644 determines whether all hosts are in the fourth host path setup state (i.e., OK) (1076). If all hosts are in the fourth host path setup state (i.e., OK) (1077), the analyzer module 644 sets the group path setup state to a fourth group path setup state (i.e., OK) (1078).

While the preceding four conditional statements 1064, 1068, 1072, 1076 should catch all host path setup state combinations, an error may be thrown if a host path setup state does not conform to one of the condition combinations.

Bus View

Figure 11:
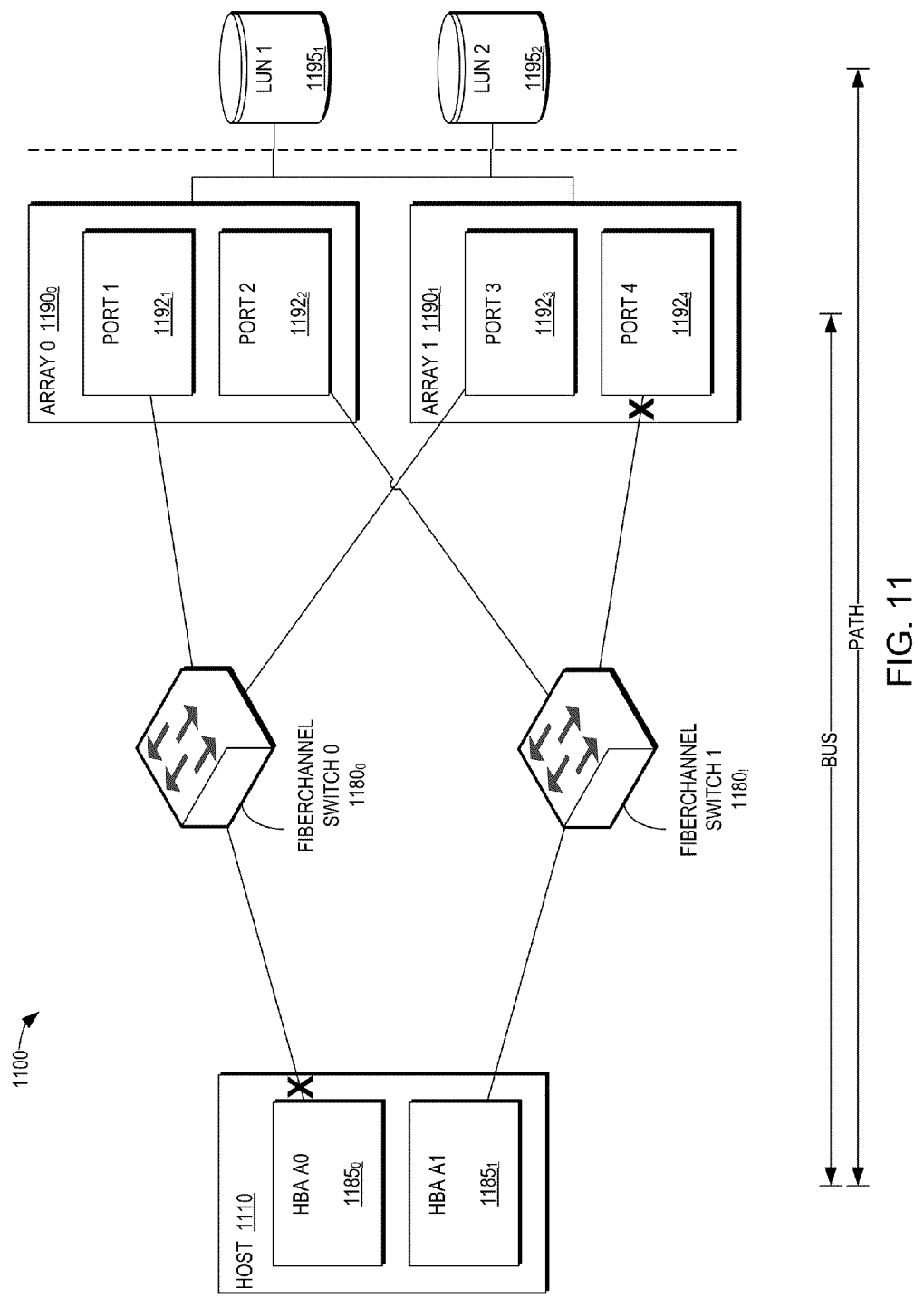
FIG. 11 is a block diagram illustrating a multi-path storage environment in which failures are experienced.

FIG. 11 is a block diagram illustrating a multi-path storage environment 1100 in which failures are experienced. The Bus View provides HBA-to-array port status in the context of a single host's storage path set. The Host Bus View provides HBA-to-array port status of the currently selected host. When an administrator clicks to highlight a host in the Host View component, the host's HBA-to-array port information becomes available in the Host Bus View. The Host Bus View thus provides a high-level view of a storage configuration in a multi-path storage environment with insight into paths that might be affected by a dead HBA port or array port. That information may be used by administrators to analyze affected LUNs in the Host LUN View.

The bus view component 1110 receives information for display, for example, from a consolidator (e.g., consolidator 640 of FIG. 6). The Bus View gives provides an administrator an aggregate view of the selected host's buses that are affected by a dead HBA port, dead array port, or dead switch port. Multiple hosts' Bus Views can be correlated to aid root cause analysis of many types of equipment faults within a SAN, such as the multi-path storage environment of FIG. 11.

For example, as illustrated in FIG. 11, the "X" at HBA port A0 $1185_0$ represents a failed HBA port on the storage configuration for the host 1110. As a result of this failed HBA port $1185_0$, the two buses that use HBA port A0 $1185_0$ are dead: (1) HBA port A0 $1185_0$ to Array 0 $1190_0$ port 1 $1192_1$; and (2) HBA port A0 $1185_0$ to Array 1 $1190_1$ port 3 $1192_3$. Consequently, any paths that use HBA port A0 $1185_0$ are dead as well: (1) HBA port A0 $1185_0$ to Array 0 $1190_0$ port 1 $1192_1$ to LUN 1 $1195_1$; (2) HBA port A0 $1185_0$ to Array 1 $1190_1$ port 3 $1192_3$ to LUN 1 $1195_1$; (3) HBA port A0 $1185_0$ to Array 0 $1190_0$ port 1 $1192_1$ to LUN 2 $1195_2$; and (4) HBA port A0 $1185_0$ to Array 1 $1190_1$ port 3 $1192_3$ to LUN 2 $1195_2$.

Similarly, the "X" at Array 1 $1190_1$ port 4 $1192_4$ represents a failed array port. As a result of this failed array port $1192_4$, bus HBA port A1 $1185_1$ to Port 4 $1192_4$ is dead. Consequently, any paths that use Port 4 $1192_4$ are dead as well: (1) HBA port A1 $1185_1$ to Array 1 $1190_1$ Port 4 $1192_4$ to LUN 1 $1195_1$; and (2) HBA port A1 $1185_1$ to Array 1 $1190_1$ Port 4 $1192_4$ to LUN 2 $1195_2$. Likewise, if a port (not shown) on the fiberchannel switch 1180 fails or the cable connecting the fiberchannel switch 1180 to the array port 1192 fails, the failure displays as an array port failure.

It should be noted that the storage path management application may not be switch-aware. That is, if a switch in the storage configuration becomes degraded, the Host Bus View may show a warning but the dead switch, itself, does not appear in the Host Bus View. For example, if the dead switch is connected to the HBA port, it appears as an HBA port warning Likewise, if the dead switch is connected to of the array port, it appears as an array port warning. This may cause confusion because, upon investigation by an administrator, the HBA ports and array ports in the affected bus may, in fact, be alive. Furthermore, even when an array port is dead, it may not display as dead in the storage path management application but rather as degraded because it is not possible for the storage path management application to determine that it is an array port failure and not an array port-side switch failure.

Figure 12A:
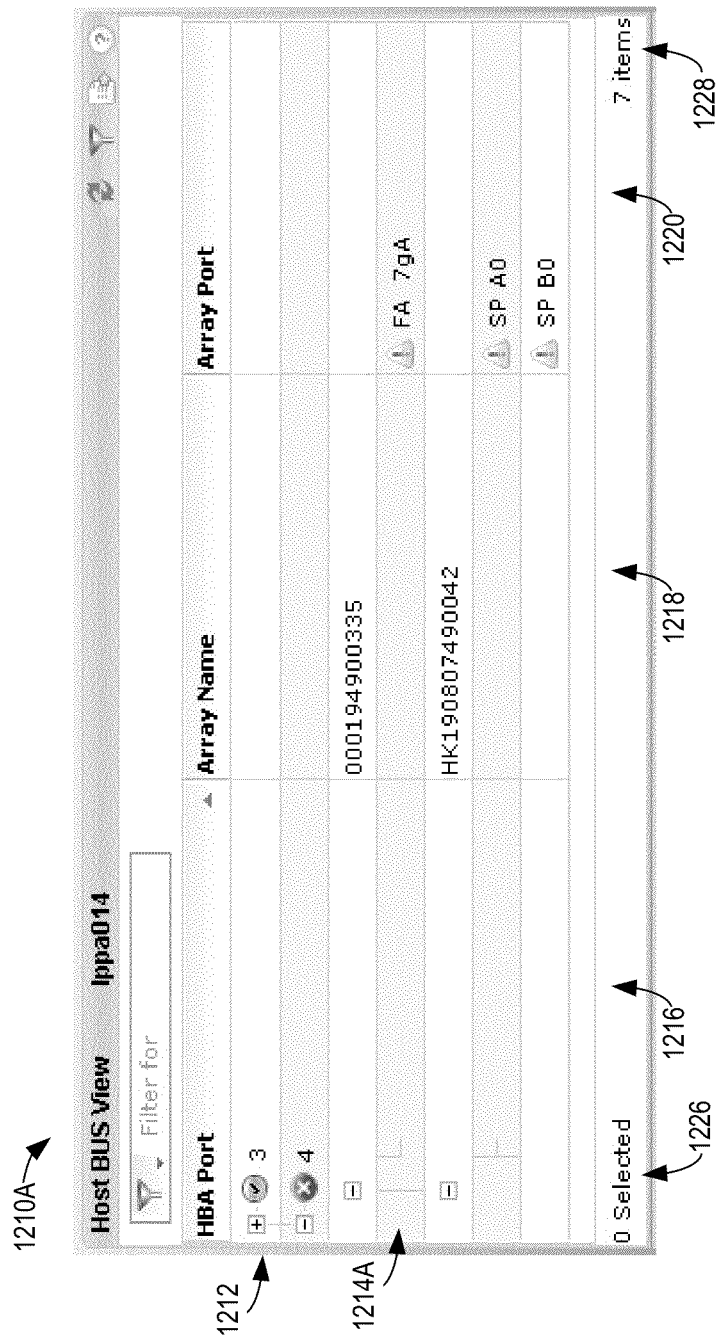
FIGS. 12A-12B are diagrams illustrating screen shots of a host bus view component of a storage path management application showing different states according to example embodiments of the present invention.

FIG. 12A is a diagram illustrating a screen shot of a host bus view component 1210A of a storage path management application (e.g., as illustrated in the screen shot 800 of FIG. 8) according to an example embodiment of the present invention. In other words, FIG. 12A depicts how an HBA port failure displays in the host bus view component 1210A. As illustrated in FIG. 12A, the host bus view component 1210A includes information columns relating to HBA port integer identifiers of a currently-selected host 1216, storage array alphanumeric identifiers for the currently-selected host 1218, and storage array ports alphanumeric identifiers for the currently-selected host 1220. The host bus view component 1210A receives information for display, for example, from a consolidator (e.g., consolidator 640 of FIG. 6). Individual HBA ports 1212 are displayed in rows, with arrays to which an HBA is connected 1214A are grouped.

Table 4, below, illustrates HBA port state and icon, along with a description of the path state for each respective HBA port state. Similarly, Table 5, below, illustrates array port state and icon, along with a description of the path state for each respective array port state.

TABLE 4

HBA port state information.

| HBA Port State/ Icon Description | HBA Port State Description |
|---|---|
| OK/ Check Mark | All paths through the HBA port are alive |
| Warning/ Exclamation Point | One or more paths through the HBA port are dead |

TABLE 4-continued

HBA port state information.

| HBA Port State/<br>Icon Description | HBA Port State<br>Description |
|---|---|
| Critical/<br>X | All paths through the HBA port<br>are dead |

TABLE 5

Array port state information.

| Array Port State/<br>Icon Description | Array Port State<br>Description |
|---|---|
| OK/<br>Check Mark | All paths to the array<br>port are alive |
| Warning/<br>Exclamation<br>Point | One or more paths to the<br>array port are dead |

Accordingly, as illustrated in FIG. 12A, HBA port 3 1212 is in an OK HBA port state and HBA port 4 1214A is in a Critical HBA port state. Expanding the node for HBA port 4 1214A shows that each of the arrays connected to the selected host via HBA port 4 1214A, namely arrays 000194900335 and HK190807490042, have array ports experiencing respective failures (i.e., array port FA 7gA of array 000194900335 and array ports SP A0 and SP B0 of array HK190807490042). With array ports FA 7gA, SP A0, and SP B0 all in a Warning state because one or more paths to the array port are dead, HBA port 4 is assigned a Critical HBA port state because all paths through HBA port 4 are dead.

Figure 12B:
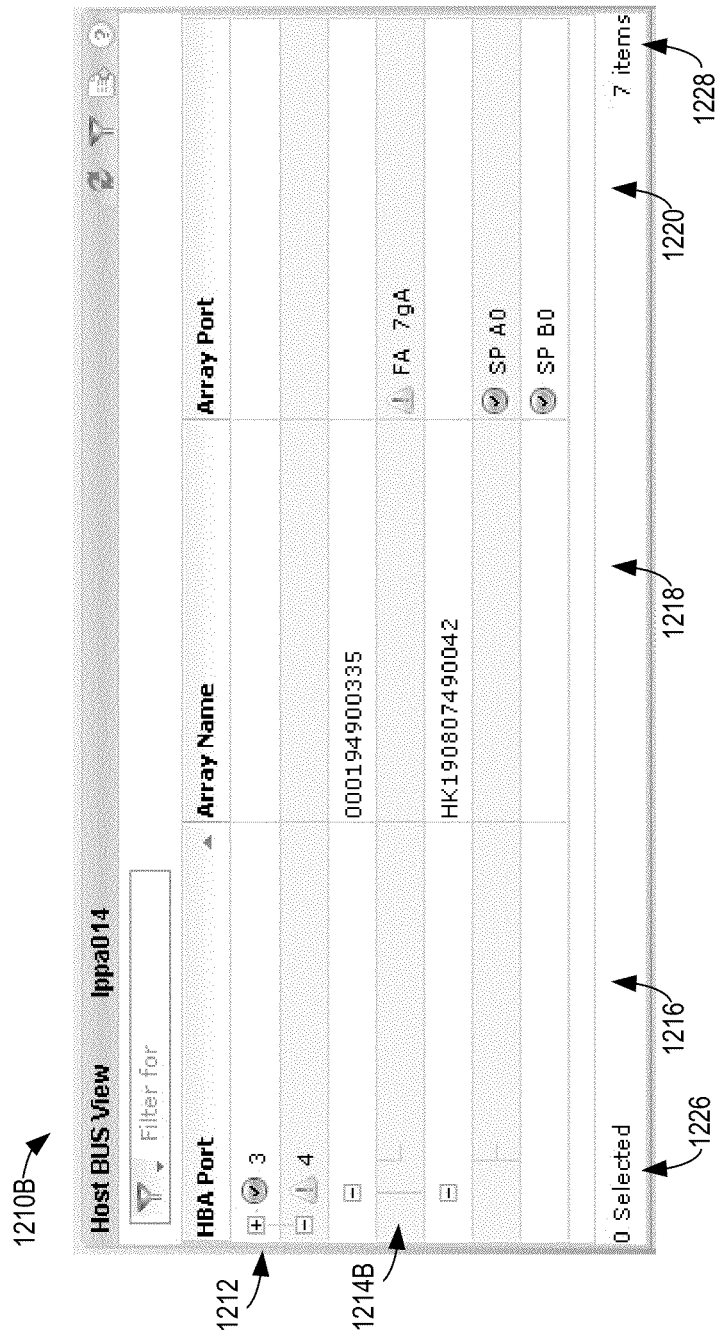

FIG. 12B is a diagram illustrating a screen shot of a host bus view component 1210B of a storage path management application (e.g., as illustrated in the screen shot 800 of FIG. 8) according to an example embodiment of the present invention. In other words, FIG. 12B depicts how an HBA port state may change according to changes in array port states, such as if a repair is made to the array ports or faulty cabling leading to the array ports is replaced. As illustrated in FIG. 12B, array ports SP A0 and SP B0 are now in an OK array port state because the paths to the respective array ports are now alive. Accordingly, the HBA port state changes to Warning from Critical because only one or more, and not all, paths through the HBA port are dead (i.e., paths to array ports SP A0 and AP B0 are alive and the path to array port FA 7gA is dead).

FIGS. 13A-13D are flow diagrams illustrating a method for providing an alert regarding a bus state according to an example embodiment of the present invention. As described above, the host bus view component 910 receives information for display, for example, from a consolidator (e.g., consolidator 640 of FIG. 6). Accordingly, the flow diagrams of FIGS. 13A-13D are described below in conjunction with the block diagram of FIG. 6.

As illustrated in FIG. 13A, a receiver module 642 receives edge point state information (e.g., HBA port information 1216 and array port information 1220 of FIGS. 12A-12B) for a bus in a multi-pathing environment (1302). An analyzer module 644 then may analyze the received edge point state information (1304). Based on the analysis, an indicator module 646 may provide an alert regarding a bus state according to the analyzed edge point information (1340). The bus may comprise edge points in a SAN. In certain embodiments, the receiver module 642 may receive an indication of whether an edge point in the pair of edge points comprising the bus experiences a fault.

As illustrated in FIG. 13B, the analyzer module 644 then may determine a first bus state for a first edge point of each pair of edge points in a group of at least one pair of edge points grouped according to a second edge point of each pair of edge points (1306). The analyzer module 644 also may set a second bus state for the second edge point according to the first bus state of each respective first edge point of each pair of edge points (1320). In certain embodiments, the analyzer module 644 may determine an array port state (e.g., array port state 1220 of FIGS. 12A-12B) for each respective path to each array port of each pair of edge points in the group of at least one pair of edge points grouped according to a host bus adapter port of each pair of edge points. Similarly, in other embodiments, the analyzer module 644 may determine a host bus adapter state (e.g., host bus adapter state 1216 of FIGS. 12A-12B) for the group of at least one pair of edge points according to the array port state of each pair of edge points in the group of at least one pair of edge points.

Figure 13C:
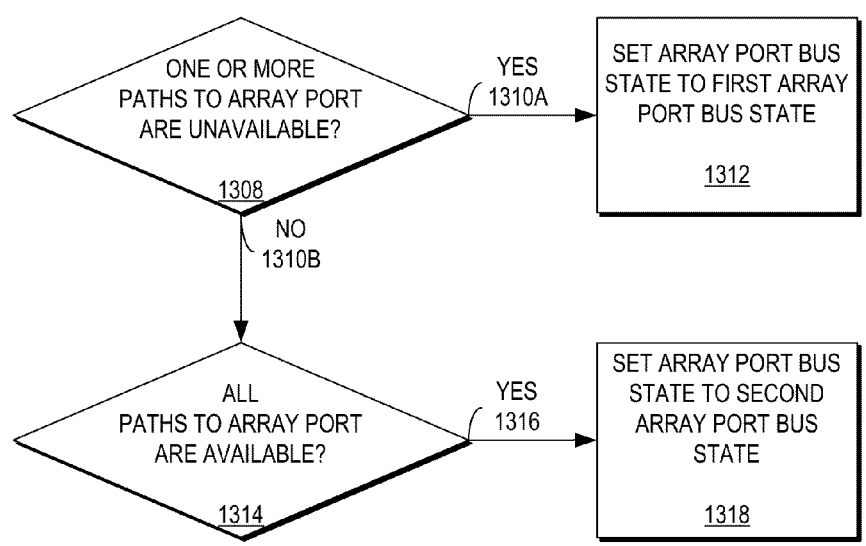

As illustrated in FIG. 13C, to determine the first bus state (i.e., array port state) for the first edge point (1306), the analyzer module 644 may determine whether one or more paths to the array port are in an unavailable state (1308). If one or more paths to the array port are in an unavailable state (1310A), the analyzer module 644 sets the array port bus state to a first array port bus state (i.e., warning) (1312). Otherwise (1310B), the analyzer module 644 determines whether all paths to the array port are in an available state (1314). If all paths to the array port are in an available state (1316), the analyzer module 644 sets the array port bus state to a second array port bus state (i.e., OK) (1318).

While the preceding two conditional statements 1308, 1314 should catch all host path setup state combinations, an error may be thrown if an array port bus state does not conform to one of the condition combinations.

Figure 13D:
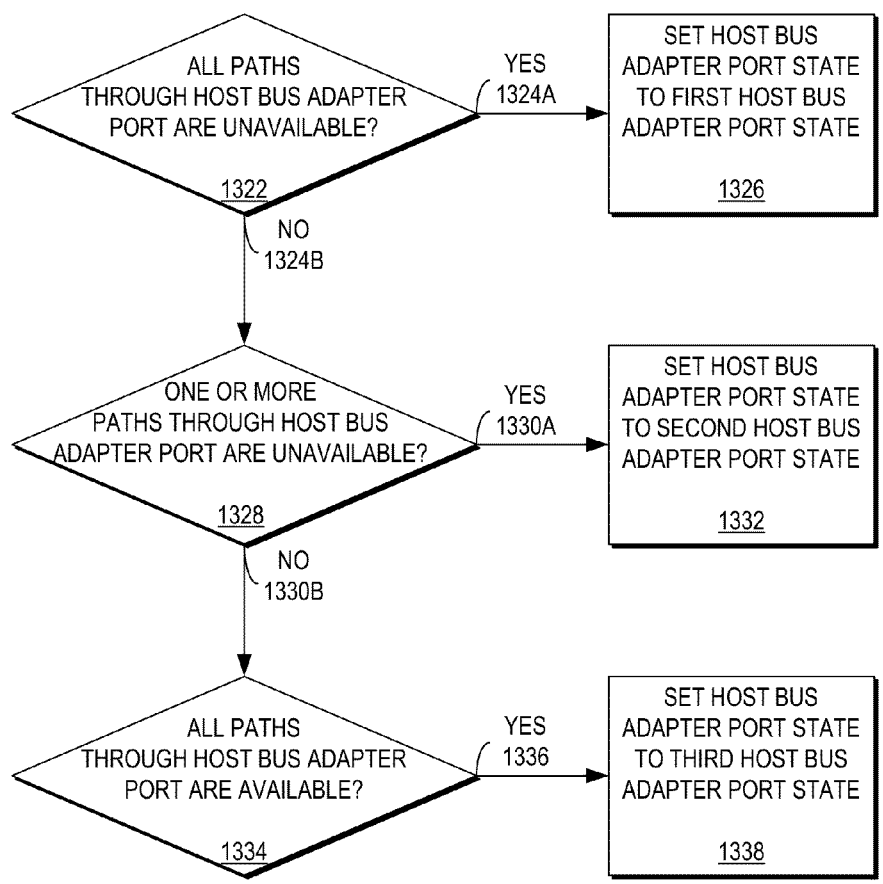

As illustrated in FIG. 13D, to set a second bus state for the second edge point according to the first bus state of each respective first edge point of each pair of edge points (1320), the analyzer module 644 may determine whether all paths through the host bus adapter port are in an unavailable state (1322). If all paths through the host bus adapter port are in an unavailable state (1324A), the analyzer module 644 sets the host bus adapter port state to a first host bus adapter port state (i.e., critical) (1326).

Otherwise (1324B), the analyzer module 644 determines whether one or more, but not all, paths through the host bus adapter port are in an unavailable state (1328). If one or more, but not all, paths through the host bus adapter port are in an unavailable state (1330A), the analyzer module 644 sets the host bus adapter port state to a second host bus adapter port state (i.e., warning) (1332).

Otherwise (1330B), the analyzer module 644 determines whether all paths through the host bus adapter port are in an available state (1334). If all paths through the host bus adapter port are in an available state 1336, the analyzer module 644 sets the host bus adapter port state to a third host bus adapter port state (i.e., OK) (1338).

While the preceding three conditional statements 1322, 1328, 1334 should catch all host path setup state combinations, an error may be thrown if an array port bus state does not conform to one of the condition combinations.

Figure 14:
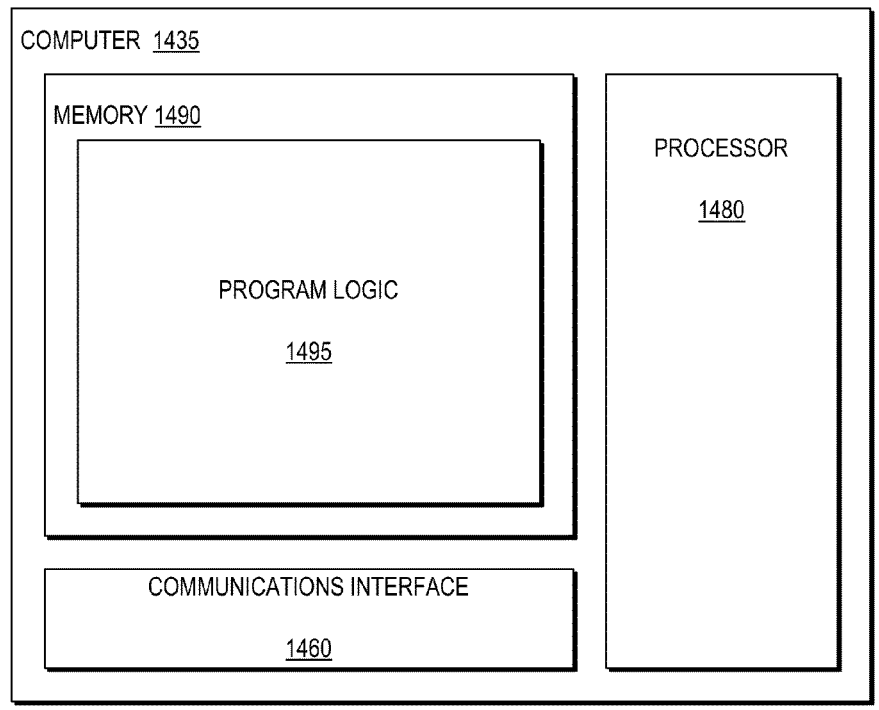
FIG. 14 is a block diagram of an example embodiment apparatus according to the present invention.

FIG. 14 is a block diagram of an example embodiment computer 1435 according to the present invention. The computer 1435 includes memory 1490 storing program logic 1495, a processor 1480, and a communications interface 1460.

The methods and apparatus of this invention may take the form, at least partially, of program code (i.e., instructions)

embodied in tangible non-transitory media, such as floppy diskettes, CD-ROMs, hard drives, random access or read only-memory, or any other machine-readable storage medium. When the program code is loaded into and executed by a machine, such as the computer of FIG. 14, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

Figure 15:
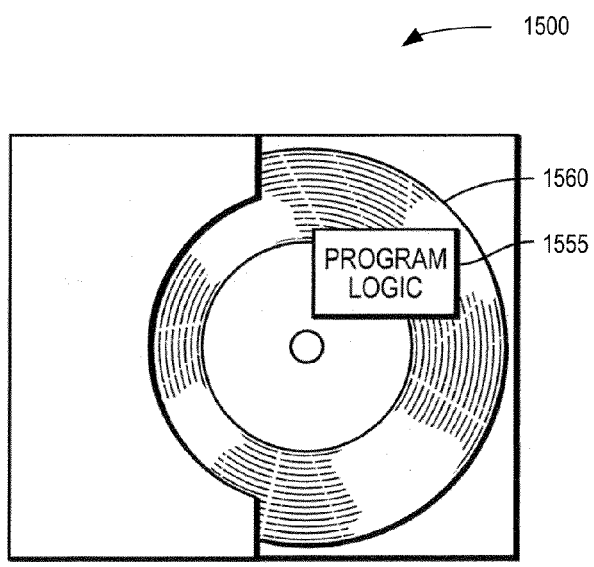
FIG. 15 is an illustration of an example embodiment of the present invention as embodied in program code.

FIG. 15 shows program logic 1555 embodied on a computer-readable medium 1560 as shown, and wherein the logic is encoded in computer-executable code configured for carrying out the methods of this invention and thereby forming a computer program product 1500.

The logic for carrying out the method may be embodied as part of the aforementioned system, which is useful for carrying out a method described with reference to embodiments shown in, for example, FIGS. 1-13D. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

The methods and apparatus of the present invention may be used in, for example, storage area networks (SANs) and a virtualization environment, that include data storage systems, such as the SYMMETRIX Integrated Cache Disk Array System or the CLARIION Disk Array System available from EMC Corporation of Hopkinton, Mass., and those provided by vendors other than EMC Corporation.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method comprising:
receiving a plurality of storage path management information items, including storage path management events and storage path resource information, having respective storage path management information types at an agent operating on a host in a multi-pathing environment;
creating at the agent an alert regarding received storage path management information items having a particular storage path management information type; and
distributing the alert from the agent to management entities in the multi-pathing environment configured to receive alerts regarding storage path management information items having the particular storage path management information type.

2. The method of claim 1 wherein creating at the agent an alert regarding received storage path management information items having a particular storage path management information type comprises analyzing the plurality of storage path management information items.

3. The method of claim 2 wherein analyzing the plurality of storage path information management items comprises:
summarizing the storage path management information items;
aggregating the storage path management information items; and
filtering the storage path management information items according to respective storage path management information item types.

4. The method of claim 3 wherein filtering the storage path management information items according to respective storage path management information items comprises:
examining a stream of storage path management information items;
determining the respective storage path management information types for storage path management information items in the stream; and
categorizing the storage path management information items according to the respective determined storage path management information type.

5. The method of claim 4 wherein distributing the alert from the agent to management entities in the multi-pathing environment configured to receive alerts regarding storage path management information items having the particular storage path management information type comprises:
preparing the alert at the agent for distribution to management entities in the multi-pathing environment according to a protocol understood by the management entities; and
distributing the alert from the agent to management entities in the multi-pathing environment according to the protocol understood by the management entities.

6. The method of claim 5 wherein distributing the alert from the agent to management information to listening management entities in the multi-pathing environment according to the protocol understood by the management entities comprises transferring the to management entities monitoring storage path management information items having the storage path management information type.

7. The method of claim 1 further comprising:
receiving a storage path management request from a management entity; and
processing the storage path management request.

8. An apparatus comprising:
a receiver module configured to receive a plurality of storage path management information items, including storage path management events and storage path resource information, having respective storage path management information types at an agent operating on a host in a multi-pathing environment;
an analyzer module configured to create at the agent an alert regarding received storage path management information items having a particular storage path management information type; and
a distributor module configured to distribute the alert from the agent to management entities in the multi-pathing environment configured to receive alerts regarding storage path management information items having the particular storage path management information type.

9. The apparatus of claim 8 wherein the analyzer module is further configured to analyze the plurality of storage path management information items.

10. The apparatus of claim 9 wherein the analyzer module is further configured to summarize the storage path management information items, aggregate the storage path management information items, and filter the storage path management information items according to respective storage path management information item types.

11. The apparatus of claim 10 wherein the analyzer module is further configured to examine a stream of storage path management information items, determine the respective storage path management information types for storage path management information items in the stream, and categorize the storage path management information items according to the respective determined storage path management information type.

12. The apparatus of claim 11 wherein the distributor module is further configured to prepare the alert at the agent for distribution to management entities in the multi-pathing environment according to a protocol understood by the management entities and distribute the alert from the agent to management entities in the multi-pathing environment according to the protocol understood by the management entities.

13. The apparatus of claim 12 wherein the distributor module is further configured to transfer the alert to management entities monitoring storage path management information items having the storage path management information type.

14. The apparatus of claim 8
wherein the receiver module is further configured to receive a storage path management request from a management entity; and
wherein the analyzer module is further configured to process the storage path management request.

15. A computer-program product including a non-transitory computer-readable storage medium encoded with computer-program code that, when executed on a processor of a computer, cause the computer to distribute an alert according to storage path information, the computer-program product comprising:
computer program code for receiving a plurality of storage path management information items, including storage path management events and storage path resource information, having a respective storage path information types at an agent operating on a host in a multi-pathing environment;
computer program code for creating at the agent an alert regarding received storage path management information items having a particular storage path management information type; and
computer program code for distributing the alert from the agent to management entities in the multi-pathing environment configured to receive alerts regarding storage path management information items having the particular storage path management information type.

16. The computer-program product of claim 15
wherein computer program code for creating at the agent an alert regarding received storage path management information items having a particular storage path management information type comprises:
computer program code for summarizing the storage path management information items;
computer program code for aggregating the storage path management information items; and
computer program code for filtering the storage path management information according to respective storage path management information item types; and
wherein computer program code for distributing an alert from the agent to management entities in the multi-pathing environment configured to receive alerts regarding storage path management information items having the particular storage path management information type comprises:
computer program code for preparing the alert at the agent for distribution to management entities in the multi-pathing environment according to a protocol understood by the management entities; and
computer program code for distributing the alert from the agent to management entities in the multi-pathing environment according to the protocol understood by the management entities.

17. The computer-program product of claim 16 wherein computer program code for filtering the storage path management information items according to respective storage path information items comprises:
computer program code for examining a stream of storage path management information items;
computer program code for determining the respective storage path management information types for storage path management information items in the stream; and
computer program code for categorizing the storage path management information items according to the respective determined storage path management information type.

18. The computer-program product of claim 15 further comprising:
computer program code for receiving a storage path management request from a management entity; and
computer program code for processing the storage path management request.

* * * * *